United States Patent
Li et al.

(10) Patent No.: US 12,117,719 B2
(45) Date of Patent: Oct. 15, 2024

(54) LASER PROJECTION APPARATUS

(71) Applicant: Hisense Laser Display Co., Ltd, Qingdao (CN)

(72) Inventors: Wei Li, Qingdao (CN); Xiaoqiang Gu, Qingdao (CN); Tiantian Tang, Qingdao (CN); Wuyue Han, Qingdao (CN); Youliang Tian, Qingdao (CN)

(73) Assignee: Hisense Laser Display Co., Ltd, Qingdao (CN)

( * ) Notice: Subject to any disclaimer, the term of this patent is extended or adjusted under 35 U.S.C. 154(b) by 163 days.

(21) Appl. No.: 18/071,438

(22) Filed: Nov. 29, 2022

(65) Prior Publication Data

US 2023/0101471 A1    Mar. 30, 2023

Related U.S. Application Data

(63) Continuation of application No. PCT/CN2021/101568, filed on Jun. 22, 2021.

(30) Foreign Application Priority Data

Jun. 22, 2020   (CN) .......................... 202010577387.X
Mar. 5, 2021    (CN) .......................... 202110243232.2

(51) Int. Cl.
   *G03B 21/20*   (2006.01)
   *G02B 26/00*   (2006.01)
   *H04N 9/31*    (2006.01)

(52) U.S. Cl.
   CPC ....... *G03B 21/204* (2013.01); *G03B 21/2053* (2013.01); *G03B 21/2066* (2013.01); *H04N 9/317* (2013.01); *G02B 26/008* (2013.01)

(58) Field of Classification Search
   CPC .............. G03B 21/204; G03B 21/2053; G03B 21/2066; G03B 21/142; G03B 21/2013;
   (Continued)

(56) References Cited

U.S. PATENT DOCUMENTS 10,368,043 B2 *   7/2019   Chiu ................... G02B 27/1006
10,809,607 B2 *  10/2020   Fan ....................... G03B 21/208
(Continued)

FOREIGN PATENT DOCUMENTS

CN       101052915 A    10/2007
CN       102418907 A     4/2012
(Continued)

OTHER PUBLICATIONS

"Chinese Application Serial No. 202010577387.2, Office Action mailed Apr. 21, 2022", w/ English Translation, 10 pgs.
(Continued)

*Primary Examiner* — Magda Cruz
(74) *Attorney, Agent, or Firm* — Schwegman Lundberg & Woessner, P.A.

(57) ABSTRACT

A laser projection apparatus includes a laser source, an optical engine and a projection lens. The optical engine includes a light homogenizing component. The laser source includes a light-emitting assembly, a combining component, a first lens, a phosphor wheel and a laser dimming component. The combining component includes a reflecting portion and a transmitting portion. The phosphor wheel includes a first region and a second region. The laser dimming component is located between the light-emitting assembly and the phosphor wheel, and configured to increase Etendue of a laser beam emitted by the light-emitting assembly and change a shape of a beam spot provided by the laser beam on the phosphor wheel, so as to make a beam spot provided by the laser beam and the fluorescent beam at a beam inlet of the light homogenizing component matched with a shape of the beam inlet of the light homogenizing component.

20 Claims, 12 Drawing Sheets

(58) Field of Classification Search
CPC .. G03B 21/2033; H04N 9/317; H04N 9/3111; H04N 9/3158; H04N 9/3161; G02B 26/008; G02B 19/0028; G02B 19/0057; G02B 27/0994; G02B 27/143; G02B 27/0927

See application file for complete search history.

(56) References Cited

U.S. PATENT DOCUMENTS

| | | | |
|---|---|---|---|
| 2007/0297061 | A1 | 12/2007 | Kyomoto |
| 2010/0328633 | A1 | 12/2010 | Sato et al. |
| 2013/0135593 | A1 | 5/2013 | Saitou |
| 2013/0250546 | A1 | 9/2013 | Hu et al. |
| 2014/0043589 | A1 | 2/2014 | Chifu |
| 2014/0160441 | A1 | 6/2014 | Kim et al. |
| 2014/0218623 | A1 | 8/2014 | Kimura et al. |
| 2014/0254129 | A1 | 9/2014 | Miyoshi et al. |
| 2014/0285774 | A1 | 9/2014 | Tajiri |
| 2015/0036107 | A1 | 2/2015 | Nagahara et al. |
| 2015/0153636 | A1 | 6/2015 | Hartwig |
| 2015/0362830 | A1* | 12/2015 | Liao .................. G03B 21/2066 353/31 |
| 2016/0088273 | A1 | 3/2016 | Fukui et al. |
| 2016/0274353 | A1 | 9/2016 | Ando et al. |
| 2016/0274446 | A1 | 9/2016 | Tanaka |
| 2016/0327851 | A1 | 11/2016 | Liao et al. |
| 2018/0180789 | A1 | 6/2018 | Russert et al. |
| 2019/0353997 | A1 | 11/2019 | Hsu et al. |
| 2020/0103737 | A1* | 4/2020 | Kawasumi ........... G02B 27/102 |

FOREIGN PATENT DOCUMENTS

| | | |
|---|---|---|
| CN | 102929086 A | 2/2013 |
| CN | 103256567 A | 8/2013 |
| CN | 103869590 A | 6/2014 |
| CN | 103930825 A | 7/2014 |
| CN | 104035266 A | 9/2014 |
| CN | 104698729 A | 6/2015 |
| CN | 105190432 A | 12/2015 |
| CN | 205176468 U | 4/2016 |
| CN | 105549312 A | 5/2016 |
| CN | 105549313 A | 5/2016 |
| CN | 105607400 A | 5/2016 |
| CN | 106195671 A | 12/2016 |
| CN | 205787562 U | 12/2016 |
| CN | 106324962 A | 1/2017 |
| CN | 205880478 U | 1/2017 |
| CN | 106385739 A | 2/2017 |
| CN | 206594438 U | 10/2017 |
| CN | 107315312 A | 11/2017 |
| CN | 107505807 A | 12/2017 |
| CN | 107561834 A | 1/2018 |
| CN | 107561835 A | 1/2018 |
| CN | 107861324 A | 3/2018 |
| CN | 107885021 A | 4/2018 |
| CN | 108008593 A | 5/2018 |
| CN | 108139066 A | 6/2018 |
| CN | 207473278 U | 6/2018 |
| CN | 207676111 U | 7/2018 |
| CN | 108663884 A | 10/2018 |
| CN | 108803215 A | 11/2018 |
| CN | 208172483 U | 11/2018 |
| CN | 108931879 A | 12/2018 |
| CN | 109375462 A | 2/2019 |
| CN | 109407450 A | 3/2019 |
| CN | 109656084 A | 4/2019 |
| CN | 109991801 A | 7/2019 |
| CN | 110221508 A | 9/2019 |
| CN | 110297384 A | 10/2019 |
| CN | 110543072 A | 12/2019 |
| CN | 110764172 A | 2/2020 |
| CN | 111025833 A | 4/2020 |
| CN | 111176063 A | 5/2020 |
| CN | 111381424 A | 7/2020 |
| CN | 111522188 A | 8/2020 |
| CN | 111522189 A | 8/2020 |
| CN | 212112111 U | 12/2020 |
| CN | 212160327 U | 12/2020 |
| CN | 113050354 A | 6/2021 |
| CN | 113311654 A | 8/2021 |
| JP | 2011075899 A | 4/2011 |
| JP | WO2012035636 A1 | 3/2012 |
| JP | 2012073489 A | 4/2012 |
| JP | 2013120250 A | 6/2013 |
| JP | 2014075221 A | 4/2014 |
| JP | 2016153878 A | 8/2016 |
| JP | 2017037106 A | 2/2017 |
| JP | 2017156403 A | 9/2017 |
| JP | 2020052236 A | 4/2020 |
| WO | WO-2012143990 A1 | 10/2012 |
| WO | WO-2019200980 A1 | 10/2019 |

OTHER PUBLICATIONS

"Chinese Application Serial No. 202110243232.X, Decision of Rejection mailed Nov. 18, 2022", w/ English Translation, 20 pgs.
"Chinese Application Serial No. 202110243232.X, Office Action mailed May 13, 2022", w/ English Translation, 16 pgs.
"Chinese Application Serial No. 202110243232.X, Office Action mailed Aug. 18, 2022", w/ English Translation, 18 pgs.
"Chinese Application Serial No. 202110243232.X, Office Action mailed Dec. 20, 2021", w/ English Translation, 19 pgs.
"Chinese Application Serial No. 202110678499.1, Notification to Grant mailed Oct. 28, 2022", w/ English Translation, 9 pgs.
"Chinese Application Serial No. 202110678499.1, Office Action mailed Jan. 6, 2022", w/ English Translation, 19 pgs.
"Chinese Application Serial No. 202110678499.1, Office Action mailed Jul. 1, 2022", w/ English Translation, 15 pgs.
"Chinese Application Serial No. 202110679835.4, Notification to Grant mailed Jul. 4, 2022", w/ English Translation, 9 pgs.
"Chinese Application Serial No. 202110679835.4, Office Action mailed Jan. 6, 2022", w/ English Translation, 18 pgs.
"International Application Serial No. PCT/CN2021/101564, International Search Report mailed Sep. 17, 2021", with English translation, 8 pgs.
"International Application Serial No. PCT/CN2021/101564, Written Opinion mailed Sep. 17, 2021", with English translation, 9 pgs.
"International Application Serial No. PCT/CN2021/101568, International Search Report mailed Sep. 15, 2021", with English translation, 9 pgs.
"International Application Serial No. PCT/CN2021/101568, Written Opinion mailed Sep. 15, 2021", with English translation, 6 pgs.
"International Application Serial No. PCT/CN2021/101615, International Search Report mailed Sep. 27, 2021", with English translation, 10 pgs.
"International Application Serial No. PCT/CN2021/101615, Written Opinion mailed Sep. 27, 2021", with English translation, 8 pgs.
"International Application Serial No. PCT/CN2021/101616, International Search Report mailed Sep. 24, 2021", with English translation, 10 pgs.
"International Application Serial No. PCT/CN2021/101616, Written Opinion mailed Sep. 27, 2021", with English translation, 6 pgs.
"International Application Serial No. PCT/CN2021/101616, Written Opinion mailed Sep. 24, 2021", with English translation, 6 pgs.
"U.S. Appl. No. 17/725,868, Notice of Allowance mailed May 23, 2023", 10 pgs.
"Chinese Application Serial No. 202110243232.X, Office Action mailed Apr. 25, 2023", with English translation, 11 pgs.

* cited by examiner

LASER PROJECTION APPARATUS

CROSS-REFERENCE TO RELATED APPLICATIONS

This application is a continuation application of International Patent Application No. PCT/CN2021/101568, filed on Jun. 22, 2021, which claims priorities to Chinese Patent Application No. 202010577387.2, filed on Jun. 22, 2020, and Chinese Patent Application No. 202110243232.X, filed on Mar. 5, 2021, which are incorporated herein by reference in their entireties.

TECHNICAL FIELD

The present disclosure relates to the field of laser projection technologies, and in particular, to a laser projection apparatus.

BACKGROUND

With the continuous development of science and technology, laser projection apparatuses are increasingly applied to people's work and life and demands of consumers for the laser projection apparatuses have gradually increased. To achieve the miniaturization of the laser projection apparatus and improve the display effect of the laser projection apparatus, not only basic illumination function should be realized, but also a volume, cost and optical efficiency will be taken into account in a design of laser source products.

SUMMARY

A laser projection apparatus is provided. The laser projection apparatus includes a laser source, an optical engine and a projection lens. The laser source is configured to emit illumination beams. The optical engine is configured to modulate the illumination beams, to obtain projection beams. The optical engine includes a light homogenizing component, and the light homogenizing component is configured to homogenize the illumination beams emitted by the laser source. The projection lens is configured to project the projection beams into an image. The laser source includes a light-emitting assembly, a combining component, a first lens, a phosphor wheel and a laser dimming component. The light-emitting assembly is configured to emit at least one laser beam. The combining component is located on a laser-exit side of the light-emitting assembly and is disposed obliquely with respect to a laser-exit direction of the light-emitting assembly. The combining component includes at least one reflecting portion and at least one transmitting portion. The at least one reflecting portion is configured to reflect a laser beam and a fluorescent beam that are incident on the at least one reflecting portion. The at least one transmitting portion is configured to transmit the at least one laser beam emitted by the light-emitting assembly. The first lens is located on a side of the combining component away from the light-emitting assembly, and the first lens is configured to converge the laser beam transmitted by the at least one transmitting portion. The phosphor wheel is located on a side of the first lens away from the combining component. The phosphor wheel includes a first region and a second region. The first region is configured to reflect the laser beam converged by the first lens. The second region is configured to be excited to emit the fluorescent beam due to irradiation of the laser beam converged by the first lens. The laser dimming component is located between the light-emitting assembly and the phosphor wheel. The laser dimming component is configured to increase Etendue of a laser beam emitted by the light-emitting assembly and change a shape of a beam spot provided by the laser beam on the phosphor wheel, to make a beam spot provided by the laser beam and the fluorescent beam at a beam inlet of the light homogenizing component matched with a shape of the beam inlet of the light homogenizing component. As the phosphor wheel is rotating, the first region reflects the laser beam incident on the first region, and the second region emits the fluorescent beam due to excitation of the laser beam incident on the second region. The laser beam and the fluorescent beam exiting from the phosphor wheel are incident on the combining component through the first lens, and the combining component reflects the laser beam and the fluorescent beam from the phosphor wheel to a beam outlet of the laser source, so as to be the illumination beams of the laser source.

BRIEF DESCRIPTION OF THE DRAWINGS

In order to describe technical solutions in the present disclosure more clearly, the accompanying drawings to be used in some embodiments of the present disclosure will be introduced briefly. However, the accompanying drawings to be described below are merely some embodiments of the present disclosure, and a person of ordinary skill in the art may obtain other drawings according to these drawings. In addition, the accompanying drawings to be described below may be regarded as schematic diagrams and are not limitations on an actual size of a product, an actual process of a method and an actual timing of a signal to which the embodiments of the present disclosure relate.

DETAILED DESCRIPTION

Figure 1:
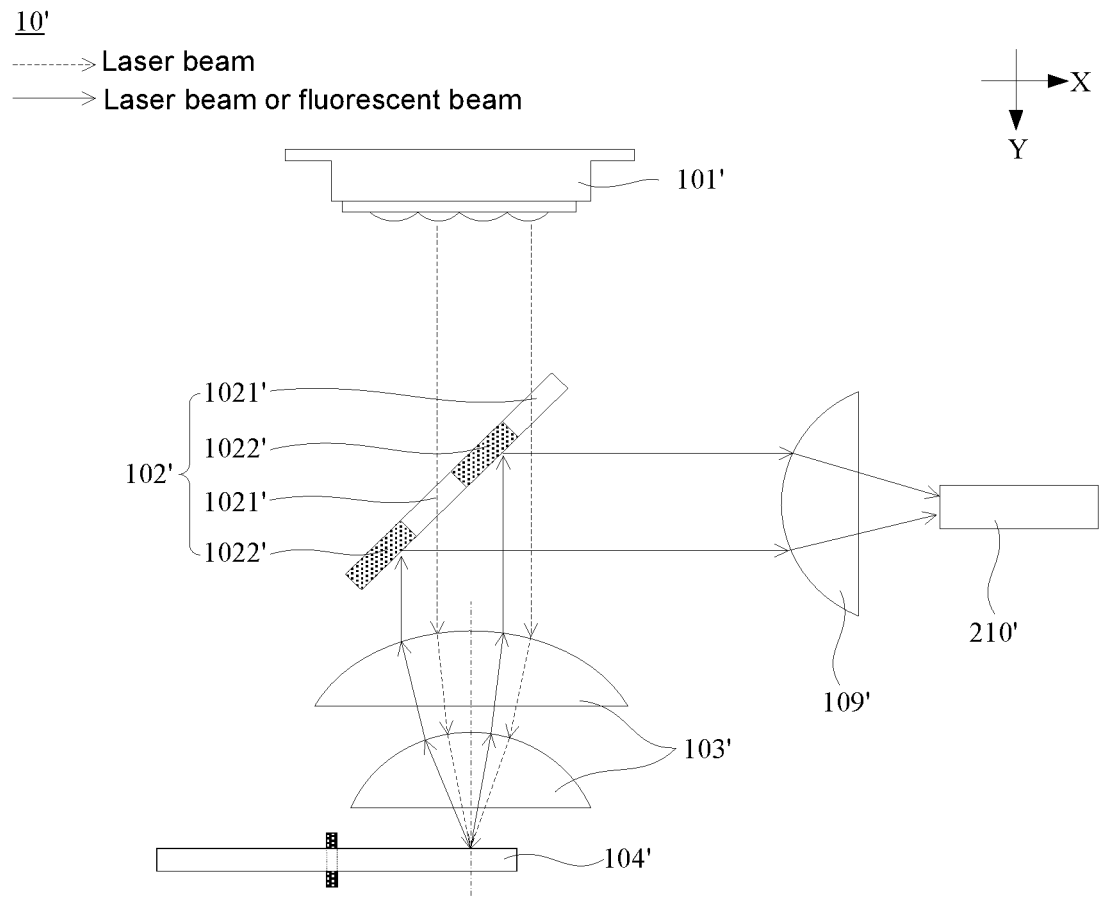
FIG. 1 is a diagram showing a structure of a laser source in the related art.

Some embodiments of the present disclosure will be described clearly and completely with reference to the accompanying drawings below. However, the described embodiments are merely some but not all embodiments of the present disclosure. All other embodiments obtained by a person of ordinary skill in the art based on the embodiments of the present disclosure shall be included in the protection scope of the present disclosure.

Unless the context requires otherwise, throughout the specification and the claims, the term "comprise" and other forms thereof such as the third-person singular form "comprises" and the present participle form "comprising" are construed as an open and inclusive meaning, i.e., "including, but not limited to". In the description of the specification, the terms such as "one embodiment", "some embodiments", "exemplary embodiments", "example", "specific example" or "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, the specific features, structures, materials, or characteristics may be included in any one or more embodiments or examples in any suitable manner.

Hereinafter, the terms such as "first" and "second" are used for descriptive purposes only and are not to be construed as indicating or implying the relative importance or implicitly indicating the number of indicated technical features. Thus, features defined by "first" or "second" may explicitly or implicitly include one or more of the features. In the description of the embodiments of the present disclosure, unless otherwise specified, the term "a/the plurality of" means two or more.

In the description of some embodiments, the term "connected" and derivatives thereof may be used. The term "connected" should be understood broadly. For example, it may be a fixed connection, a detachable connection, or an integral connection; and it may be a direct connection or may be an indirect connection through an intermediate medium.

The phrase "A and/or B" includes following three combinations: only A, only B, and a combination of A and B.

The use of the phrase "applicable to" or "configured to" herein means an open and inclusive expression, which does not exclude apparatuses that are applicable to or configured to perform additional tasks or steps.

The term such as "about", "substantially" or "approximately" as used herein includes a stated value and an average value within an acceptable range of deviation of a particular value. The acceptable range of deviation is determined by a person of ordinary skill in the art, considering measurement in question and errors associated with measurement of a particular quantity (i.e., limitations of a measurement system).

The term such as "parallel", "perpendicular" or "equal" as used herein includes a stated condition and a condition similar to the stated condition. A range of the similar condition is within an acceptable deviation range, and the acceptable deviation range is determined by a person of ordinary skill in the art, considering measurement in question and errors associated with the measurement of a particular quantity (i.e., limitation of a measurement system).

Figure 2:
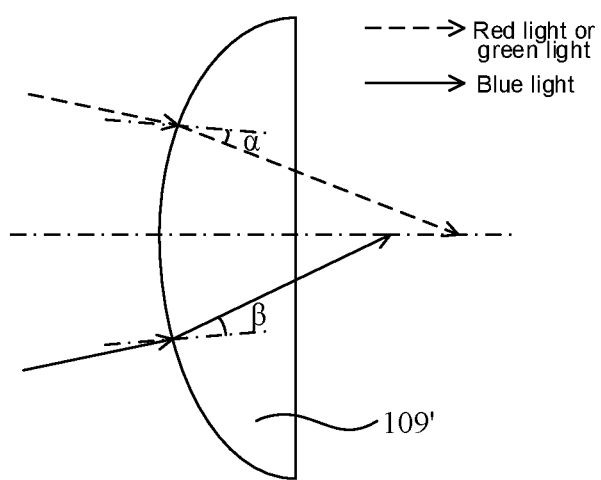
FIG. 2 is a diagram showing beam paths of beams with different wavelengths passing through a converging lens in the related art.

FIG. 1 is a diagram showing a structure of a laser source in the related art. FIG. 2 is a diagram showing beam paths of beams with different wavelengths passing through a converging lens in the related art.

In the related art, as shown in FIG. 1, a laser source 10' includes a light-emitting assembly 101', a combining component 102', a first lens 103', a phosphor wheel 104', a converging lens 109' and a light homogenizing component 210'. The combining component 102' includes a transmitting portion 1021' and a reflecting portion 1022'. The phosphor wheel 104' is rotatable, and the phosphor wheel 104' includes a fluorescence region and a laser-reflecting region. The fluorescence region is configured to be excited to emit a fluorescent beam due to irradiation of a laser beam. The laser-reflecting region is configured to reflect the laser beam transmitted by the combining component 102'.

A laser beam emitted by the light-emitting assembly 101' is incident on the phosphor wheel 104' after sequentially passing through the transmitting portion 1021' and the first lens 103'. As the phosphor wheel 104' rotates, the laser beam incident on the phosphor wheel 104' is incident on different regions of the phosphor wheel 104'. In a case where the laser beam irradiates the fluorescence region, the fluorescence region is excited to emit the fluorescent beam. In a case where the laser beam irradiates the laser-reflecting region, the laser beam is reflected by the laser-reflecting region, so that the phosphor wheel 104' may emit the laser beam and the fluorescent beam in a time-division manner. The beams (including the laser beam and the fluorescent beam) exiting from the phosphor wheel 104' are incident on the combining component 102' after passing through the first lens 103' and are reflected by the reflecting portion 1022' of the combining component 102' to the converging lens 109'. The converging lens 109' converges the beams incident on the converging lens 109' to a beam inlet of the light homogenizing component 210' (e.g., a light pipe) for displaying a projection image. It will be noted that, the time-division manner refers to different moments.

Since the fluorescent beam exiting from the fluorescence region may exit in all directions, and the laser beam reflected by the laser-reflecting region of the phosphor wheel 104' exits only in a reflection direction of the laser beam, an area of a beam spot formed by the fluorescent beam emitted by the phosphor wheel 104' on the combining component 102' is greater than an area of a beam spot formed by the laser beam reflected by the phosphor wheel 104' on the combining component 102'. A color uniformity of a beam spot formed by the fluorescent beam and the laser beam after combination is poor, resulting in a poor color uniformity and display effect of the projection image.

In addition, a wavelength of the laser beam reflected by the phosphor wheel 104' is different from a wavelength of the fluorescent beam emitted by the phosphor wheel 104'. Beams with different wavelengths have different angles of refraction after passing through the converging lens 109', and after passing through the converging lens 109', the smaller the wavelength of a beam, the greater the angle of refraction. Therefore, the angles of refraction of the laser beam and the fluorescent beam are different from each other after passing through the converging lens 109', resulting in a chromatic aberration phenomenon of the converging lens 109'.

For example, as shown in FIG. 2, an angle β of refraction of blue light after passing through the converging lens 109' is greater than an angle α of refraction of red light (or green light) after passing through the converging lens 109'. Thus, a beam spot formed by the beams converged by the converging lens 109' at the beam inlet of the light homogenizing component 210' has a color boundary phenomenon. For example, a beam spot formed by beams of three primary colors at the beam inlet of the light homogenizing component 210' is substantially in a shape of a circle, and an outer ring of the beam spot appears red. In a direction from the outside to the inside, the beam spot sequentially shows different colors such as purple, blue and yellow.

In this way, after the laser beam and the fluorescent beam are converged to the beam inlet of the light homogenizing component 210' by the converging lens 109', the area of the beam spot formed by the laser beam is less than the area of the beam spot formed by the fluorescent beam. A difference between the areas of the beam spots formed by the laser beam and the fluorescent beam at the beam inlet of the light homogenizing component 210' is large, resulting in a poor color uniformity of the beam spot formed by the beams emitted by the laser source 10', and thus a poor display effect of the projection image is caused.

To solve the above problem, some embodiments of the present disclosure provide a laser projection apparatus 1. The laser projection apparatus 1 may reduce the difference between areas of beam spots formed by the beams with different colors emitted by the laser source and improve the display effect of the projection image.

Figure 3:
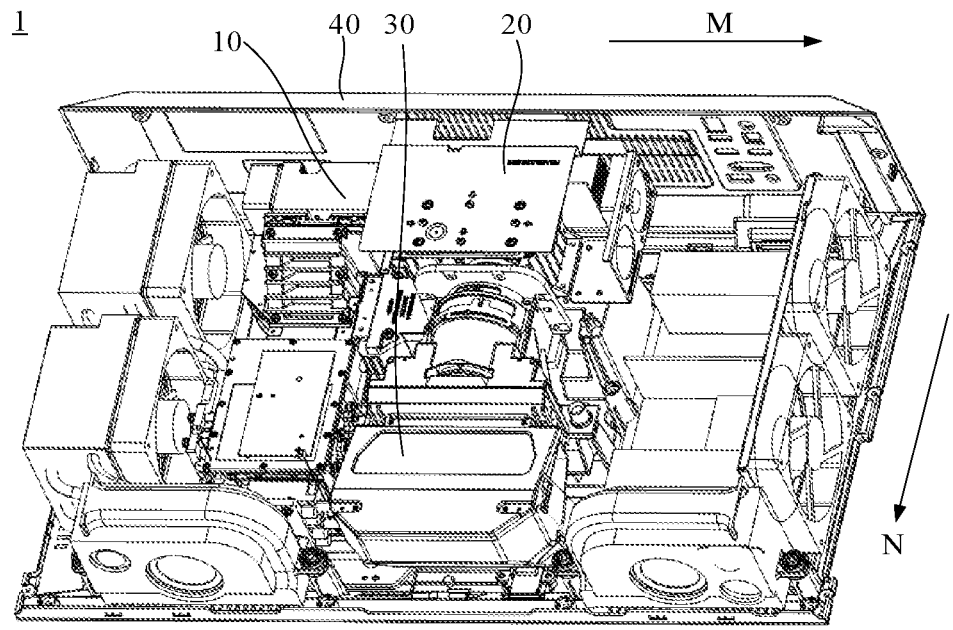
FIG. 3 is a diagram showing a structure of a laser projection apparatus, in accordance with some embodiments.

FIG. 3 is a diagram showing a structure of a laser projection apparatus, in accordance with some embodiments. As shown in FIG. 3, the laser projection apparatus 1 includes an apparatus housing 40 (only a portion of the apparatus housing 40 being shown in FIG. 3), and a laser source 10, an optical engine 20 and a projection lens 30 that are assembled in the apparatus housing 40. The laser source 10 is configured to provide illumination beams (e.g., laser beams). The optical engine 20 is configured to modulate the illumination beams provided by the laser source 10 with image signals, so as to obtain projection beams. The projection lens 30 is configured to project the projection beams into an image on a screen or a wall.

The laser source 10, the optical engine 20, and the projection lens 30 are sequentially connected in a propagation direction of beams and are each wrapped by a corresponding housing. The housings of the laser source 10, the optical engine 20 and the projection lens 30 support their corresponding optical components respectively and make the optical components meet certain sealing or airtight requirements.

Figure 4:
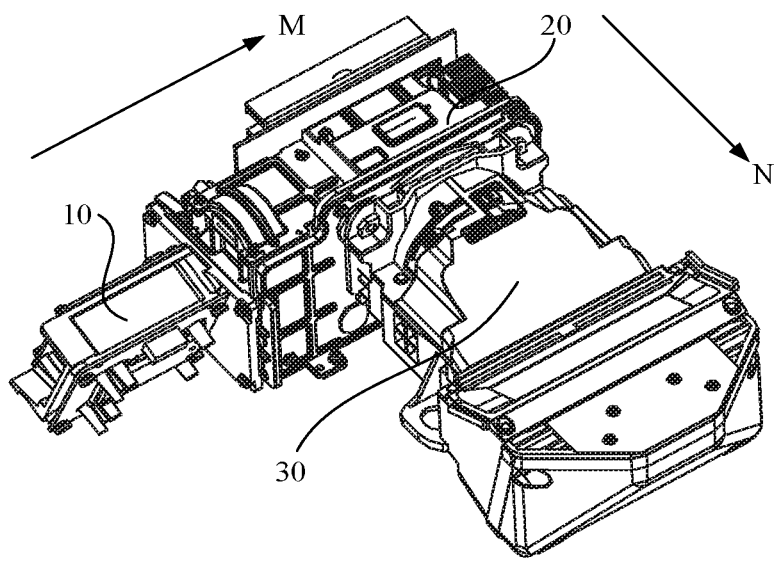
FIG. 4 is a diagram showing a partial structure of a laser projection apparatus, in accordance with some embodiments.

FIG. 4 is a diagram showing a partial structure of a laser projection apparatus, in accordance with some embodiments.

As shown in FIG. 4, an end of the optical engine 20 is connected to the laser source 10, and the laser source 10 and the optical engine 20 are arranged in an exit direction of the illumination beams of the laser projection apparatus 1 (referring to the M direction shown in FIG. 4). Another end of the optical engine 20 is connected to the projection lens 30, and the optical engine 20 and the projection lens 30 are arranged in an exit direction of the projection beams of the laser projection apparatus 1 (referring to the N direction shown in FIG. 4). The exit direction M of the illumination beams is substantially perpendicular to the exit direction N of the projection beams. In one aspect, such a connection structure may adapt to characteristics of a beam path of a reflective light valve in the optical engine 20, and in another aspect, it is also conducive to shortening a length of a beam path in a one-dimensional direction, which is helpful for structural arrangement of the apparatus. For example, in a case where the laser source 10, the optical engine 20 and the projection lens 30 are disposed in the one-dimensional direction (e.g., the direction M), a length of a beam path in the one-dimensional direction is long, which is not conducive to the structural arrangement of the apparatus. The reflective light valve will be described below.

In some embodiments, the laser source 10 may provide beams of three primary colors sequentially (beams of other colors may also be added on a basis of the beams of three primary colors). However, due to a phenomenon of visual persistence of human eyes, what the human eyes see is white beams formed by mixing the beams of three primary colors. Alternatively, the laser source 10 may also simultaneously output the beams of three primary colors, to continuously emit the white beams. The laser source 10 includes a laser device. The laser device may emit laser beams of at least one color, such as red laser beams, blue laser beams or green laser beams.

Figure 5:
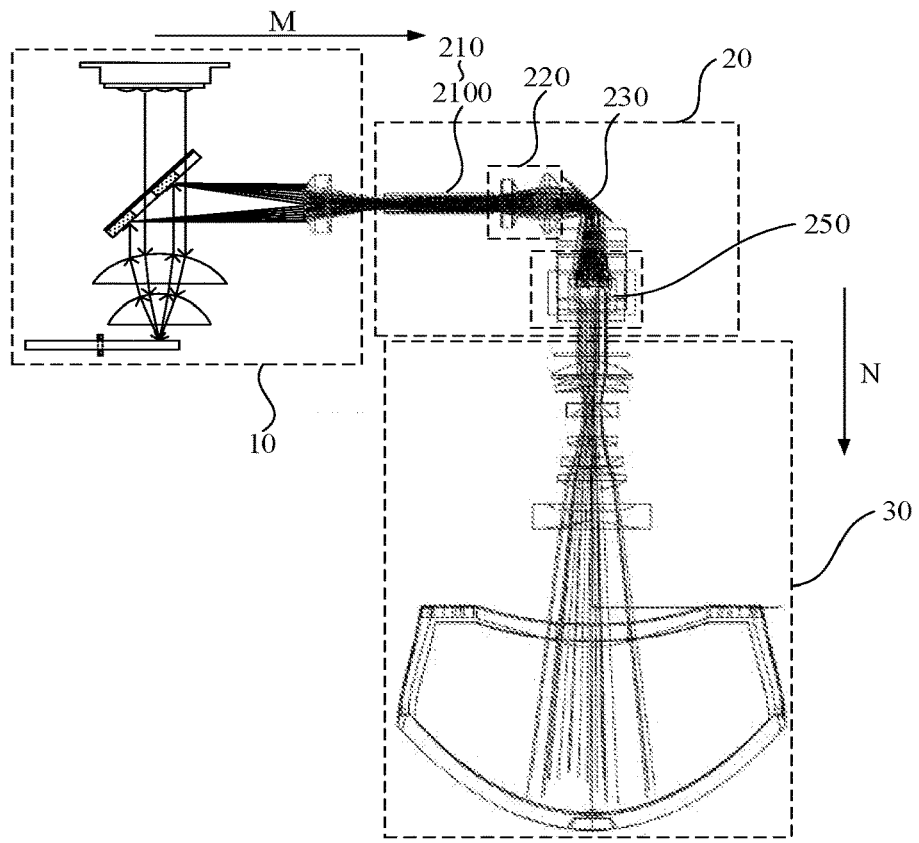
FIG. 5 is a diagram showing a beam path of a laser source, an optical engine, and a projection lens in a laser projection apparatus, in accordance with some embodiments.
Figure 6:
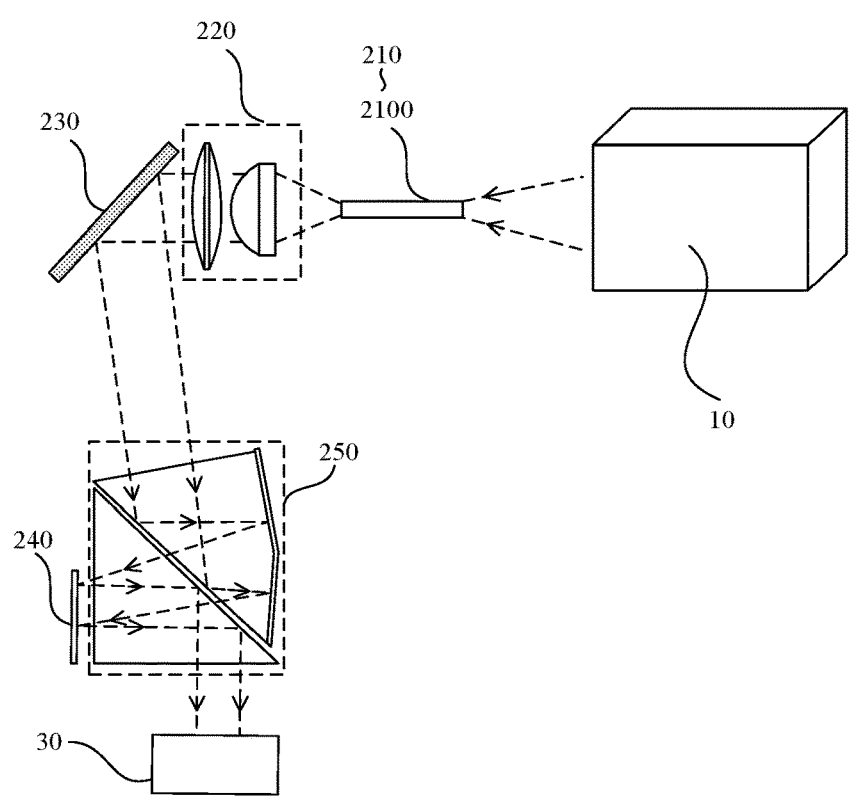
FIG. 6 is a diagram showing another beam path of a laser source, an optical engine, and a projection lens in a laser projection apparatus, in accordance with some embodiments.

FIG. 5 is a diagram showing a beam path of a laser source, an optical engine and a projection lens in a laser projection apparatus, in accordance with some embodiments. FIG. 6 is a diagram showing another beam path of a laser source, an optical engine and a projection lens in a laser projection apparatus, in accordance with some embodiments.

The illumination beams emitted by the laser source 10 enter the optical engine 20. Referring to FIGS. 5 and 6, the optical engine 20 includes a light homogenizing component 210, a lens assembly 220, a reflector 230, a digital micromirror device (DMD) 240 and a prism assembly 250. The light homogenizing component 210 may receive the illumination beams provided by the laser source 10 and homogenize the illumination beams. For example, the light homogenizing component 210 includes a light pipe 2100, and a beam outlet of the light pipe 2100 may be in a shape of a rectangle, so as to have a shaping effect on a beam spot. The lens assembly 220 may first collimate the illumination beams, and then converge the collimated illumination beams and emit the converged illumination beams to the reflector 230. The reflector 230 may reflect the illumination beams to the prism assembly 250. The prism assembly 250 reflects the illumination beams to the DMD 240. The DMD 240 modulates the illumination beams, to obtain the projection beams, and reflects the projection beams into the projection lens 30. It will be noted that, the light homogenizing component 210 may also include other components (e.g., a fly-eye lens or a diffusion sheet) with a light homogenizing function.

In the optical engine 20, the DMD 240 modulates the illumination beams provided by the laser source 10 through the image signals. That is, the DMD 240 controls the projection beams to display different luminance and gray scales according to different pixels of an image to be displayed, to finally produce an optical image. Therefore, the DMD 240 is also referred to as an optical modulator or a light valve. Depending on whether the optical modulator (or the light valve) transmits or reflects the illumination beams, the optical modulator may be classified as a transmissive optical modulator or a reflective optical modulator. For example, the DMD 240 shown in FIG. 6 reflects the illumination beams, and thus it is the reflective optical modulator. A liquid crystal light valve transmits the illumination beams, and thus it is the transmissive optical modulator. In addition, according to the number of the optical modulators used in the optical engine 20, the optical engine 20 may be classified as a single-chip system, a double-chip system, or a three-chip system. For example, only one DMD 240 is used in the optical engine 20 shown in FIG. 6, and thus the optical engine 20 may be referred to as the single-chip system. In a case where three digital micromirror devices 240 are used, the optical engine 20 may be referred to as the three-chip system.

It will be noted that, according to a projection architecture, the optical modulators may be of many kinds, such as a liquid crystal on silicon (LCOS), a liquid crystal display (LCD) or a digital micromirror device (DMD). Since the optical engine 20 shown in FIG. 6 applies a digital light processing (DLP) projection architecture in some embodiments of the present disclosure, the optical modulators in some embodiments of the present disclosure are digital micromirror devices (DMD) 240.

Figure 7:
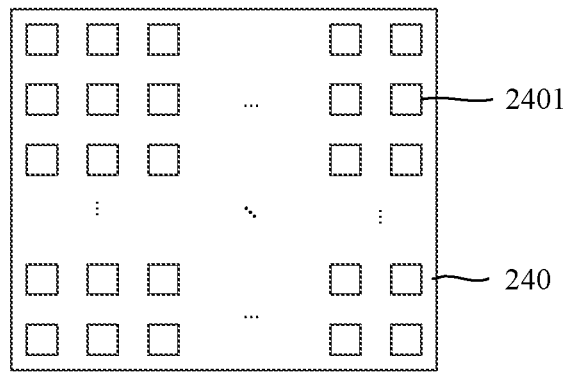
FIG. 7 is a diagram showing an arrangement of micromirrors in a digital micromirror device, in accordance with some embodiments.
Figure 8:
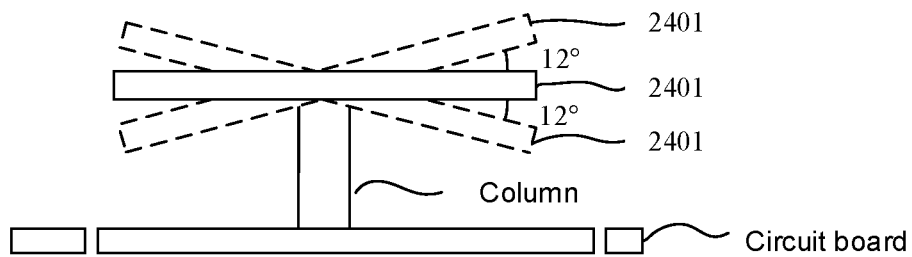
FIG. 8 is a diagram showing a swing position of a micromirror in the digital micromirror device shown in FIG. 7.
Figure 9:
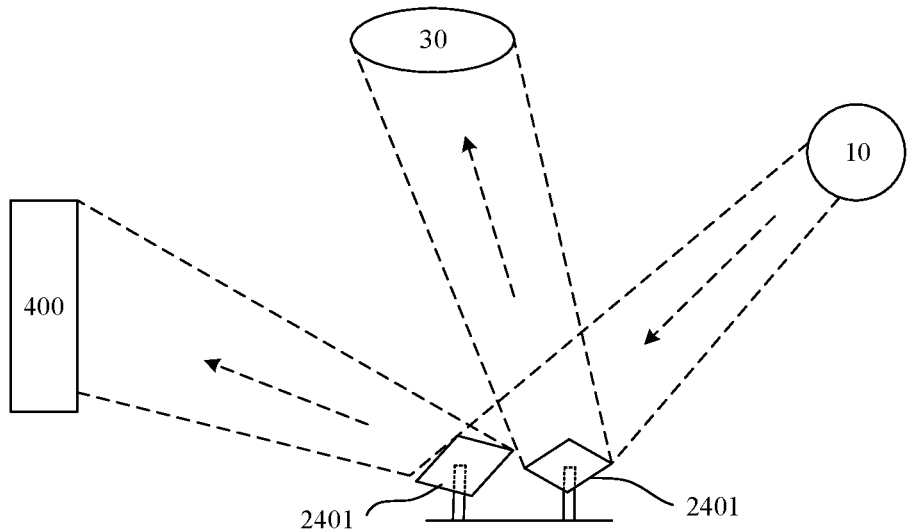
FIG. 9 is a schematic diagram showing operation of micromirrors, in accordance with some embodiments.

FIG. 7 is a diagram showing an arrangement of micromirrors in a digital micromirror device, in accordance with some embodiments. FIG. 8 is a diagram showing a swing position of a micromirror in the digital micromirror device shown in FIG. 7. FIG. 9 is a schematic diagram showing operation of micromirrors, in accordance with some embodiments.

As shown in FIGS. 7 and 8, the digital micromirror device 240 includes thousands of micromirrors 2401 that may be individually driven. These micromirrors 2401 are arranged in an array, and each micromirror 2401 corresponds to one pixel in the image to be displayed. In the DLP projection architecture, each micromirror 2401 is equivalent to a digital switch. The micromirror may swing within a range of plus or minus 12 degrees (i.e., ±12°) or a range of plus or minus 17 degrees (i.e., ±17°) due to an action of an external force.

As shown in FIG. 9, a laser beam reflected by the micromirror 2401 at a negative deflection angle is referred to as an OFF laser beam, and the OFF laser beam is an ineffective laser beam, which usually irradiates on the housing of the optical engine 20 or is absorbed by a laser absorption portion 400. A laser beam reflected by the micromirror 2401 at a positive deflection angle is referred to as an ON laser beam. The ON laser beam is an effective beam reflected by the micromirror 2401 on a surface of the DMD 240 when it receives irradiation of the illumination beams, and the ON laser beam enters the projection lens 30 at a positive deflection angle for projection imaging. An ON state of the micromirror 2401 is a state that the micromirror 2401 is in and may be maintained when the illumination beams emitted by the laser source 10 may enter the projection lens 30 after being reflected by the micromirror 2401. That is, the micromirror 2401 is in a state of the positive deflection angle. An OFF state of the micromirror 2401 is a state that the micromirror 2401 is in and may be maintained when the illumination beams emitted by the laser source 10 does not enter the projection lens 30 after being reflected by the micromirror 2401. That is, the micromirror 2401 is in a state of the negative deflection angle.

In a display cycle of a frame of an image, some or all of the micromirrors 2401 are switched once between the ON state and the OFF state, so that gray scales of pixels in the frame image are achieved according to durations of the micromirrors 2401 in the ON state and the OFF state. For example, in a case where the pixels have 256 gray scales from 0 to 255, micromirrors 2401 corresponding to a gray scale 0 are each in the OFF state in an entire display cycle of the frame of the image, micromirrors 2401 corresponding to a gray scale 255 are each in the ON state in the entire display cycle of the frame of the image, and micromirrors 2401 corresponding to a gray scale 127 are each in the ON state for a half of time and in the OFF state for another half of time in the display cycle of the frame of the image. Therefore, by controlling a state that each micromirror 2401 in the DMD 240 is in and a duration of each state in the display cycle of the frame of the image through the image signals, luminance (the gray scale) of a pixel corresponding to the micromirror 2401 may be controlled, thereby dimming the illumination beams projected onto the DMD 240.

The light homogenizing component 210, the lens assembly 220 and the reflector 230 at a front end of the DMD 240 form an illumination path, and the illumination beams emitted by the laser source 10 pass through the illumination path to have a size and an incident angle which meet the requirements of the DMD 240.

As shown in FIG. 5, the projection lens 30 includes a combination of a plurality of lenses, which are usually divided by groups, and are divided into a three-segment combination including a front group, a middle group and a rear group, or a two-segment combination including a front group and a rear group. The front group is a lens group proximate to a laser-exit side of the laser projection apparatus 1 (e.g., a side of the projection lens 30 away from the optical engine 20 along the N direction in FIG. 5), and the rear group is a lens group proximate to a laser-exit side of the optical engine 20 (e.g., a side of the projection lens 30 proximate to the optical engine 20 along the opposite direction of the N direction in FIG. 5). The projection lens 30 may be a zoom projection lens, or a prime focus-adjustable projection lens, or a prime projection lens.

In some embodiments, the laser projection apparatus 1 is an ultra-short-focus laser projection apparatus, and the projection lens 30 is an ultra-short-focus projection lens. A projection ratio of the projection lens 30 is usually less than 0.3, such as 0.24. In a case of a same projection distance, the smaller the projection ratio, the larger the projection image of the laser projection apparatus 1. The ultra-short-focus projection lens with a small projection ratio can adapt to a narrow space while ensuring the projection effect. In this way, the laser projection apparatus 1 may perform a large-sized projection display with a small projection ratio.

For ease of description, some embodiments of the present disclosure are mainly described by taking an example in which the laser source 10 sequentially outputs the beams of three primary colors, the laser projection apparatus 1 adopts the DLP projection architecture, the optical modulator of the optical engine 20 is the digital micromirror device 240, the light homogenizing component 210 of the optical engine 20 is the light pipe 2100, and the projection lens 30 is the ultra-short-focus projection lens. However, this should not be construed as a limitation of the present disclosure.

The laser source 10 according to some embodiments of the present disclosure will be described in detail below.

Figure 10:
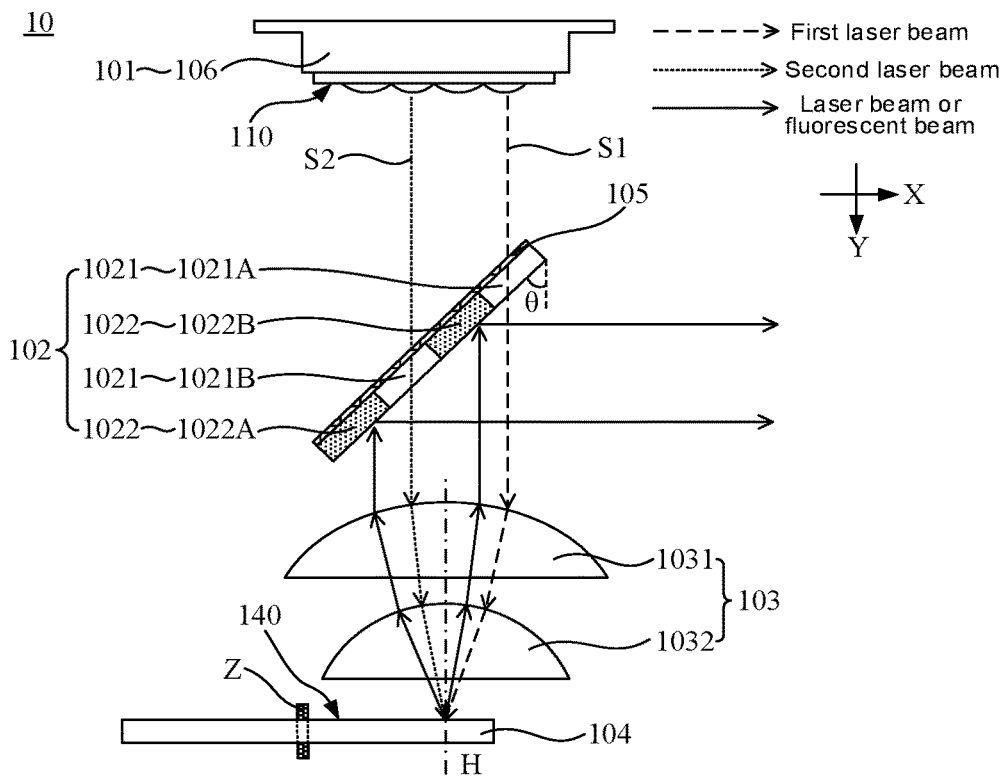
FIG. 10 is a diagram showing a beam path of a laser source, in accordance with some embodiments.
Figure 11:
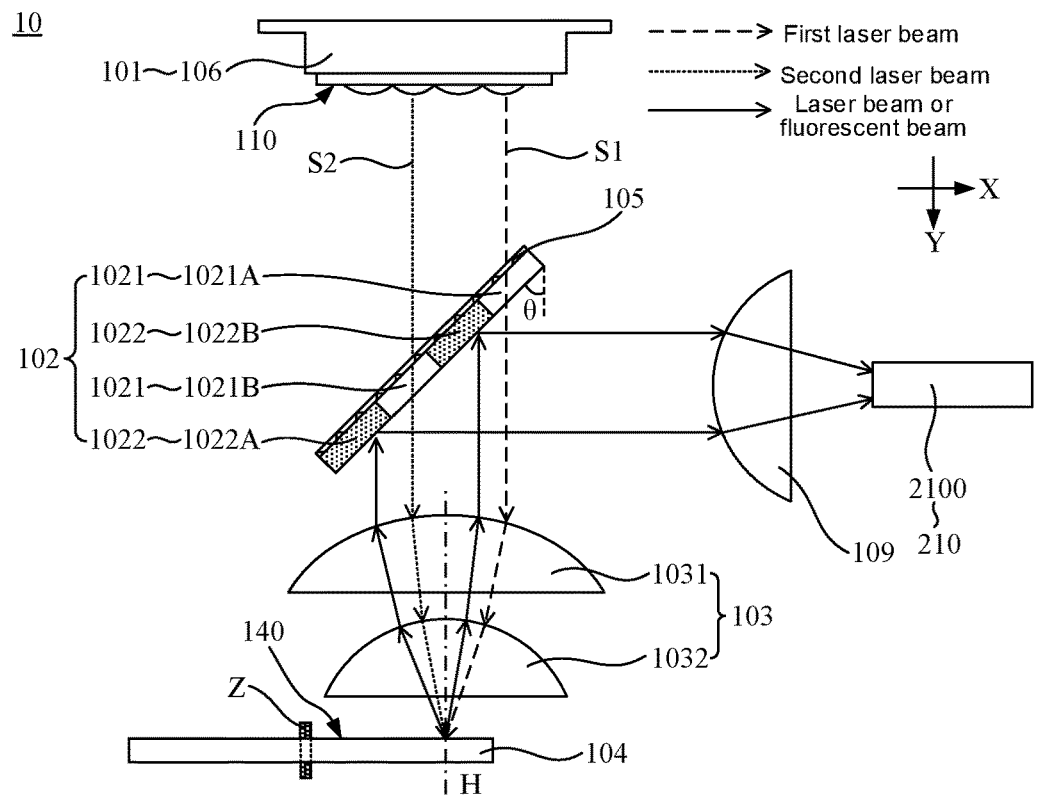
FIG. 11 is a diagram showing a beam path of another laser source, in accordance with some embodiments.

FIG. 10 is a diagram showing a beam path of a laser source, in accordance with some embodiments. FIG. 11 is a diagram showing a beam path of another laser source, in accordance with some embodiments.

In some embodiments, as shown in FIG. 10, the laser source 10 includes a light-emitting assembly 101, a combining component 102, a first lens 103, a phosphor wheel 104, and a laser dimming component 105. The light-emitting assembly 101, the combining component 102, the first lens 103 and the phosphor wheel 104 are sequentially arranged along a first direction Y.

The light-emitting assembly 101 is configured to emit one or more laser beams. For example, as shown in FIG. 10, the light-emitting assembly 101 emits the laser beam along the first direction Y. The laser beam is incident on the phosphor wheel 104 after sequentially passing through the laser dimming component 105, the combining component 102 and the first lens 103.

The laser dimming component 105 is configured to increase Etendue of the laser beam emitted by the light-emitting assembly 101 and change a shape of a beam spot formed by the laser beam on the phosphor wheel 104. For example, a divergence angle of the laser beam after passing through the laser dimming component 105 increases; the manner in which the laser beam changes the shape of the beam spot formed on the phosphor wheel 104 will be described below.

The combining component 102 is configured to transmit the laser beam incident on the combining component 102 and reflect the laser beam reflected by the phosphor wheel 104 or the fluorescent beam emitted by the phosphor wheel 104.

The first lens 103 is configured to converge the laser beam transmitted by the combining component 102, so as to form a small beam spot on a laser receiving surface 140 of the phosphor wheel 104.

The phosphor wheel 104 is located on a side of the first lens 103 away from the combining component 102, and the phosphor wheel 104 is configured to reflect the laser beam incident on the phosphor wheel 104 and be excited to emit the fluorescent beam due to irradiation of the laser beam incident on the phosphor wheel 104. The laser beam reflected by the phosphor wheel 104 and the fluorescent beam emitted by the phosphor wheel 104 are incident on the combining component 102 after passing through the first lens 103 and exit along a second direction X after being reflected by the combining component 102. It will be noted that, the present disclosure is described by taking an example in which the first direction Y is perpendicular to the second direction X. However, the present disclosure is not limited thereto. An included angle between the first direction Y and the second direction X may be an obtuse angle or an acute angle.

As shown in FIG. 11, the laser source 10 further includes a converging lens 109. The combining component 102 and the converging lens 109 are sequentially arranged along the second direction X. The converging lens 109 is configured to converge the laser beam and the fluorescent beam reflected by the combining component 102 and emit the converged laser beam and fluorescent beam to the light pipe 2100 through a beam outlet of the laser source 10.

In this way, the laser beam and the fluorescent beam exiting from the combining component 102 along the second direction X may be combined into the illumination beams of the laser source 10 after being converged by the converging lens 109, to be used in a subsequent beam path.

It will be noted that, the converging lens 109 includes only one lens. Alternatively, the converging lens 109 may also include a plurality of lenses. In addition, some embodiments of the present disclosure are described by taking an example in which the laser receiving surface 140 of the phosphor wheel 104 is perpendicular to a laser-exit direction (e.g., the first direction Y) of the light-emitting assembly 10. However, the present disclosure is not limited thereto.

In some embodiments, the light-emitting assembly 101 is configured to emit a plurality of laser beams. For example, as shown in FIG. 10, the light-emitting assembly 101 emits a first laser beam S1 and a second laser beam S2.

In some embodiments, as shown in FIG. 10, the light-emitting assembly 101 includes a laser device 106. The plurality of laser beams are emitted by the laser device 106. For example, the laser device 106 may be a multi-chip laser diode (MCL) device. The MCL device may include a plurality of light-emitting chips arranged in an array and encapsulated in a same tube shell. Each light-emitting chip may emit a laser beam independently and may emit the laser beam at a same time or at different time as other light-emitting chips. The plurality of laser beams emitted by the light-emitting assembly 101 are respectively emitted by different light-emitting regions of the laser device 106. For example, the first laser beam S1 and the second laser beam S2 are emitted by different light-emitting chips in the laser device 106.

FIG. 10 mainly illustrates an example in which a laser-exit surface 110 of the laser device 106 is parallel to the laser receiving surface 140 of the phosphor wheel 104, and the laser device 106 directly emits the plurality of laser beams to the combining component 102. Of course, in some embodiments, the laser-exit surface 110 of the laser device 106 may also be perpendicular to the laser receiving surface 140 of the phosphor wheel 104.

Figure 12:
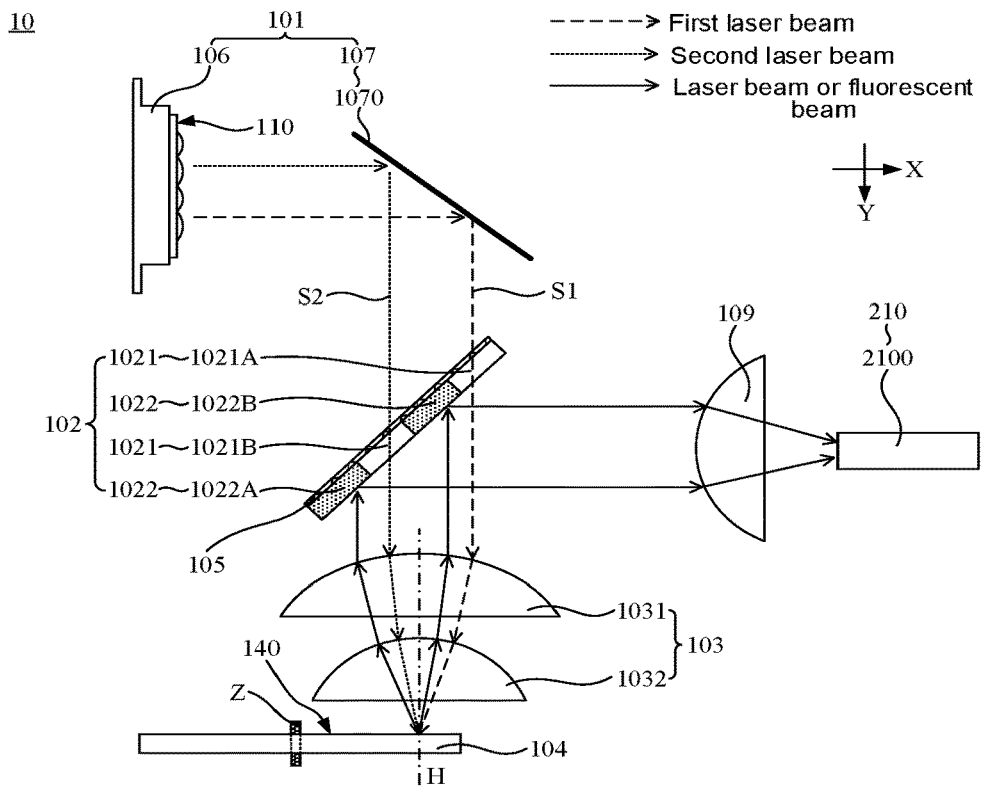
FIG. 12 is a diagram showing a beam path of yet another laser source, in accordance with some embodiments.
Figure 13:
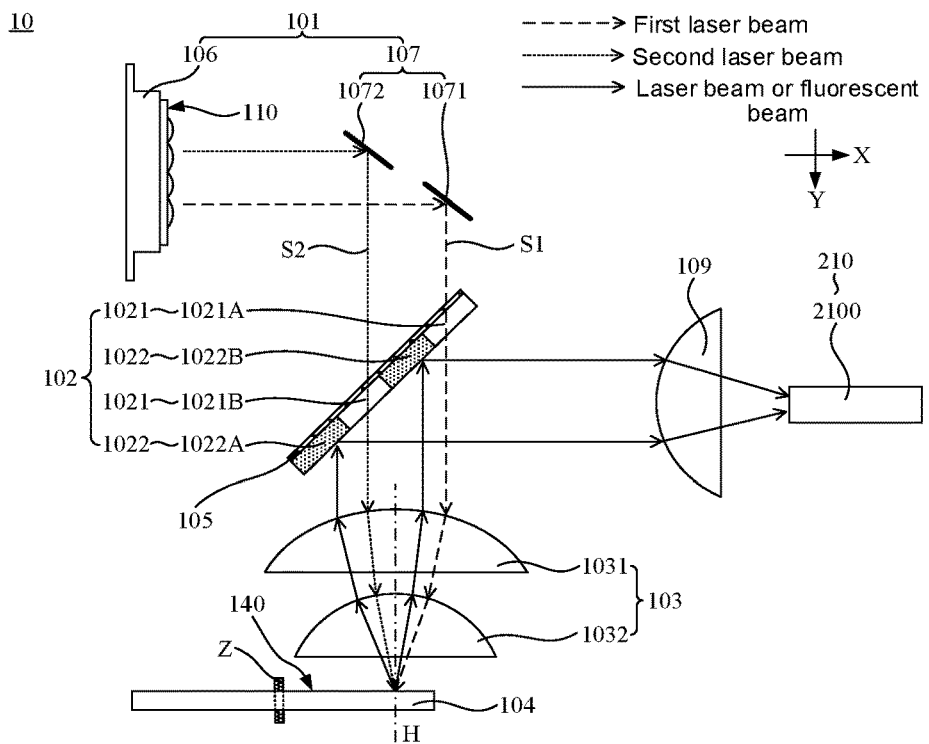
FIG. 13 is a diagram showing a beam path of yet another laser source, in accordance with some embodiments.
Figure 14:
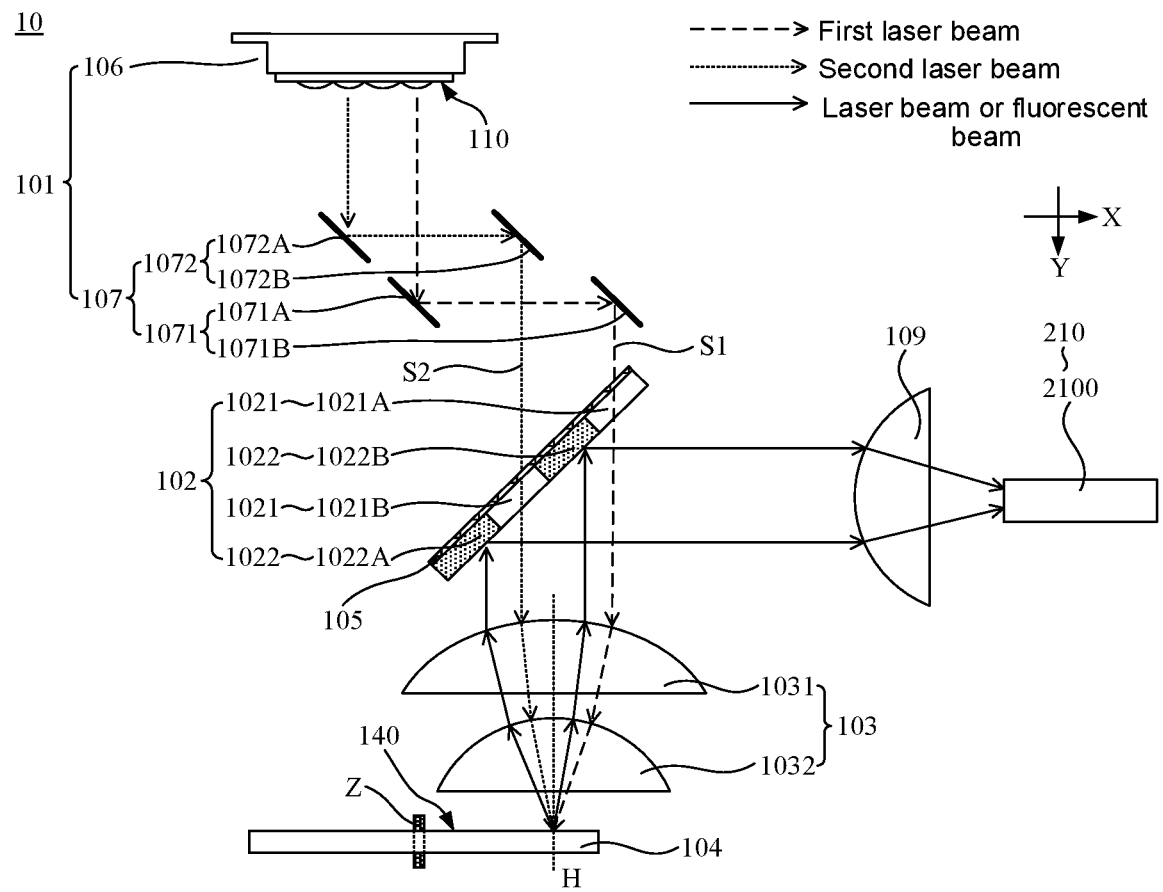
FIG. 14 is a diagram showing a beam path of yet another laser source, in accordance with some embodiments.

FIG. 12 is a diagram showing a beam path of yet another laser source, in accordance with some embodiments. FIG. 13 is a diagram showing a beam path of yet another laser source, in accordance with some embodiments. FIG. 14 is a diagram showing a beam path of yet another laser source, in accordance with some embodiments.

In some embodiments, as shown in FIGS. 12 to 14, the light-emitting assembly 101 further includes a mirror group 107, and the mirror group 107 is located on a laser-exit side of the laser device 106. The mirror group 107 is configured to reflect the laser beam emitted by the laser device 106 to the combining component 102.

For example, as shown in FIG. 12, the laser device 106 and the mirror group 107 are sequentially arranged along the second direction X, and the mirror group 107, the combining component 102, the first lens 103 and the phosphor wheel 104 are sequentially arranged along the first direction Y.

In some embodiments, the mirror group 107 may include only one mirror (e.g., a reflector) 1070, and the mirror 1070 is configured to change a propagation direction of the laser beam emitted by the laser device 106, so that the laser beam emitted by the laser device 106 may be incident on the combining component 102. For example, as shown in FIG. 12, the laser beam emitted by the laser device 106 is incident on the mirror 1070 along the second direction X and is reflected by the mirror 1070 to the combining component 102 along the first direction Y.

In some embodiments, the mirror group 107 may include a plurality of mirrors. The plurality of mirrors are configured to split the laser beam emitted by the laser device 106, so as to split the laser beam into a plurality of laser beams, and adjust a distance between the obtained split laser beams through adjusting a position of each mirror.

For example, as shown in FIG. 13, the plurality of mirrors include a first mirror 1071 and a second mirror 1072. In a case where the laser device 106 emits only one laser beam, the first mirror 1071 and the second mirror 1072 each are configured to reflect different portions of the one laser beam emitted by the laser device 106, to form the first laser beam S1 and the second laser beam S2. Of course, the first laser beam S1 and the second laser beam S2 may also be formed of a plurality of laser beams emitted by one laser device 106 or a plurality of laser devices 106 through the reflection of the first mirror 1071 and the second mirror 1072, the present disclosure is not limited thereto.

As shown in FIG. 13, the greater a distance between the first mirror 1071 and the second mirror 1072 in a laser-exit direction (e.g., the second direction X in FIG. 13) of the laser device 106, the greater a distance between the two laser beams obtained by splitting the laser beam emitted by the laser device 106 by the first mirror 1071 and the second mirror 1072. Therefore, the distance between the laser beams exiting from the mirrors may be adjusted through adjusting the distance between the first mirror 1071 and the second mirror 1072 in the laser-exit direction of the laser device 106.

In some embodiments, distances between each of the plurality of mirrors and the laser-exit surface 110 of the laser device 106 are not equal. A distance between the mirror and the laser-exit surface 110 of the laser device 106 includes a minimum distance between any point on a surface of the mirror proximate to the laser device 106 and the laser-exit surface 110 of the laser device 106.

In some embodiments, in any two of the plurality of mirrors, at least a portion of an orthogonal projection of a mirror on the laser-exit surface 110 of the laser device 106 does not overlap with at least a portion of an orthogonal projection of another mirror on the laser-exit surface 110 of the laser device 106, so as to prevent the one mirror from blocking the laser beams reflected by the another mirror. Moreover, the minimum distance between one mirror and the laser-exit surface 110 of the laser device 106 is greater than a maximum distance between another mirror and the laser-exit surface 110 of the laser device 106.

In this way, a distance between any point on a surface of each mirror proximate to the laser device 106 and the laser-exit surface 110 of the laser device 106 is not equal to a distance between any point on a surface of other mirror proximate to the laser device 106 and the laser-exit surface 110 of the laser device 106.

The above description is given mainly by taking an example in which the mirror group 107 includes one first mirror 1071 and one second mirror 1072. Of course, in some embodiments, the mirror group 107 may also include a plurality of first mirrors 1071 and a plurality of second mirrors 1072, to reflect the laser beams exiting from different regions of the laser-exit surface 110 of the laser device 106 to the combining component 102. In this case, the laser-exit surface 110 of the laser device 106 may be parallel to the laser-receiving surface 140 of the phosphor wheel 104.

For example, as shown in FIG. 14, the plurality of first mirrors 1071 include a first sub-mirror 1071A and a second sub-mirror 1071B, and the plurality of second mirrors 1072 include a third sub-mirror 1072A and a fourth sub-mirror 1072B.

The first sub-mirror 1071A and the second sub-mirror 1071B are arranged in parallel to each other, and the first sub-mirror 1071A and the second sub-mirror 1071B are sequentially arranged along the second direction X. The first sub-mirror 1071A reflects a portion of the laser beam emitted by the laser device 106 to the second sub-mirror 1071B, and the second sub-mirror 1071B reflects the laser beam incident on the second sub-mirror 1071B to the combining component 102.

The third sub-mirror 1072A and the fourth sub-mirror 1072B are arranged in parallel to each other, and the third sub-mirror 1072A and the fourth sub-mirror 1072B are sequentially arranged along the second direction X. The third sub-mirror 1072A reflects another portion of the laser beam emitted by the laser device 106 to the fourth sub-mirror 1072B, and the fourth sub-mirror 1072B reflects the laser beam incident on the fourth sub-mirror 1072B to the combining component 102.

Thus, the mirror group 107 may split the laser beam emitted by the laser device 106 into two laser beams and reflect the two laser beams to the combining component 102.

It will be noted that, on a plane perpendicular to the second direction X, at least a portion of an orthogonal projection of the first sub-mirror 1071A overlaps with at least a portion of an orthogonal projection of the second sub-mirror 1071B. Moreover, on a plane perpendicular to the first direction Y, at least a portion of an orthogonal projection of the second sub-mirror 1071B overlaps with at least a portion of an orthogonal projection of the combining component 102. Thus, the laser beam reflected by the first sub-mirror 1071A may exit to the second sub-mirror 1071B, and the laser beam reflected by the second sub-mirror 1071B may exit to the combining component 102. A positional relationship between the third sub-mirror 1072A and the fourth sub-mirror 1072B is similar to a positional relationship between the first sub-mirror 1071A and the second sub-mirror 1071B, a positional relationship between the fourth sub-mirror 1072B and the combining component 102 is similar to a positional relationship between the second sub-mirror 1071B and the combining component 102, and details will not be repeated herein.

In some embodiments, as shown in FIG. 10, the combining component 102 is located on a laser-exit side of the light-emitting assembly 101 and is disposed obliquely with respect to the laser-exit direction (e.g., the first direction Y in FIG. 10) of the light-emitting assembly 101. For example, an included angle θ between the laser-exit direction of the light-emitting assembly 101 and the combining component 102 is an acute angle. Thus, the combining component 102 may reflect the laser beam and the fluorescent beam incident on the combining component 102 along the second direction X.

In some embodiments, as shown in FIG. 10, the combining component 102 includes a transmitting portion 1021 and a reflecting portion 1022. The reflecting portion 1022 is configured to reflect the laser beam and the fluorescent beam incident on the reflecting portion 1022. The transmitting portion 1021 is configured to transmit the laser beam emitted by the light-emitting assembly 101.

For example, the laser beam emitted by the light-emitting assembly 101 is incident on the combining component 102 along the first direction Y. The laser beam may be incident on the first lens 103 through the transmitting portion 1021 of the combining component 102, and then converged to the phosphor wheel 104 through the first lens 103.

Of course, in some embodiments, the combining component 102 may further include only the reflecting portion 1022. In this case, regions on both sides of the reflecting portion 1022 each may be used as the transmitting portion 1021, to transmit the laser beam from the light-emitting assembly 101. It will be noted that, the regions on both sides of the reflecting portion 1022 refer to a region of the reflecting portion 1022 proximate to the light-emitting assembly 101 and a region of the reflecting portion 1022 away from the light-emitting assembly 101.

In some embodiments, the combining component 102 may also include a plurality of transmitting portions 1021 and a plurality of reflecting portions 1022, and the plurality of transmitting portions 1021 and the plurality of reflecting portions 1022 are alternately arranged.

For example, as shown in FIG. 10, the combining component 102 includes a first reflecting portion 1022A, a second reflecting portion 1022B, a first transmitting portion 1021A, and a second transmitting portion 1021B. The first reflecting portion 1022A, the second transmitting portion 1021B, the second reflecting portion 1022B, and the first transmitting portion 1021A are alternately arranged in sequence. The first reflecting portion 1022A is proximate to the phosphor wheel 104, and the first transmitting portion 1021A is away from the phosphor wheel 104 and proximate to the light-emitting assembly 101. The first laser beam S1 and the second laser beam S2 emitted by the light-emitting assembly 101 are incident on the first transmitting portion 1021A and the second transmitting portion 1021B, respectively, and are incident on the first lens 103 after being transmitted through the two transmitting portions 1021.

Of course, in some embodiments, the combining component 102 may also include one transmitting portion 1021 and one reflecting portion 1022.

In some embodiments, a number of transmitting portions 1021 corresponds to a number of laser beams emitted by the light-emitting assembly 101. For example, the first laser beam S1 and the second laser beam S2 emitted by the light-emitting assembly 101 correspond to the first transmitting portion 1021A and the second transmitting portion 1021B, respectively, and the first laser beam S1 and the second laser beam S2 are incident on the first transmitting portion 1021A and the second transmitting portion 1021B, respectively.

It will be noted that, in a case where the light-emitting assembly 101 includes the mirror group 107, the laser beam exiting from the mirror group 107 corresponds to the transmitting portion 1021. For example, in a case where the mirror group 107 includes the plurality of mirrors, the number of the plurality of laser beams after being split by the mirror group 107 corresponds to the number of the plurality of transmitting portions 1021, and the plurality of laser beams after being split are incident on the plurality of transmitting portions 1021, respectively. Moreover, on a plane perpendicular to the laser-exit direction of the light-emitting assembly 101, orthogonal projections of some of the plurality of mirrors at least partially overlap with orthogonal projections of the plurality of transmitting portions 1021, respectively.

The following description will be given by taking an example in which the combining component 102 includes the first reflecting portion 1022A, the second reflecting portion 1022B, the first transmitting portion 1021A, and the second transmitting portion 1021B.

In some embodiments, the transmitting portions 1021 and the reflecting portions 1022 are arranged in a one-to-one correspondence manner. For example, as shown in FIG. 10, in the combining component 102, the first transmitting portion 1021A corresponds to the first reflecting portion 1022A, and the second transmitting portion 1021B corresponds to the second reflecting portion 1022B. In this way, a laser beam transmitted through a transmitting portion 1021 may be reflected by the phosphor wheel 104 to a reflecting portion 1022 corresponding to the transmitting portion 1021.

In some embodiments, on the plane perpendicular to the laser-exit direction of the light-emitting assembly 101, at least a portion of the orthogonal projection of the transmitting portion 1021 and at least a portion of the orthogonal projection of a corresponding reflecting portion 1022 are symmetrical with respect to an optical axis H of the first lens 103. Moreover, in a case where the combining component 102 includes the plurality of transmitting portions 1021 and the plurality of reflecting portions 1022, the plurality of transmitting portions 1021 may be asymmetric with respect to the optical axis H of the first lens 103.

For example, as shown in FIG. 10, on the plane perpendicular to the laser-exit direction of the light-emitting assembly 101, at least a portion of an orthogonal projection of the first transmitting portion 1021A and at least a portion of an orthogonal projection of a corresponding first reflecting portion 1022A are symmetrical with respect to the optical axis H of the first lens 103; and at least a portion of an orthogonal projection of the second transmitting portion 1021B and at least a portion of an orthogonal projection of a corresponding second reflecting portion 1022B are symmetrical with respect to the optical axis H of the first lens 103. The second transmitting portion 1021B and the first transmitting portion 1021A are located on two sides of the optical axis H of the first lens 103, and are asymmetric with respect to the optical axis H. Thus, the laser beam transmitted by a transmitting portion 1021 will not be transmitted through another transmitting portion 1021 after being reflected by the phosphor wheel 104.

In some embodiments, an area of the transmitting portion 1021 may be less than an area of the reflecting portion 1022. For example, in the combining component 102, a total area of all the transmitting portions 1021 is less than a total area of all the reflecting portions 1022. Alternatively, an area of each transmitting portion 1021 is less than an area of a reflecting portion 1022 adjacent to the transmitting portion 1021. Alternatively, the area of each transmitting portion 1021 is less than an area of each reflecting portion 1022.

In some embodiments, the area of the transmitting portion 1021 may be less than or equal to one-fourth the area of the reflecting portion 1022.

It will be noted that, the area of the transmitting portion 1021 in the combining component 102 only needs to be sufficient to allow the laser beam incident on the transmitting portion 1021 to pass through. By reducing the area of the transmitting portion 1021, it is possible to reduce a loss of the laser beam and the fluorescent beam from the phosphor wheel 104 when being transmitted through the transmitting portion 1021, and improve a utilization rate of the laser beam and the fluorescent beam.

In some embodiments, as shown in FIGS. 10 and 11, the combining component 102 has a laser-incident surface and a laser-exit surface, and the laser-incident surface and the laser-exit surface are disposed opposite to each other. The laser-incident surface of the combining component 102 faces toward the light-emitting assembly 101, and an included angle between the laser-incident surface and the optical axis H of the first lens 103 is an acute angle. The laser-exit surface of the combining component 102 faces toward the first lens 103, and an included angle between the laser-exit surface and the optical axis H of the first lens 103 is also an acute angle. Moreover, the laser-exit surface of the combining component 102 also faces toward the converging lens 109.

In some embodiments, the combining component 102 may be in a shape of a plate, and the laser-incident surface and the laser-exit surface of the combining component 102 are parallel to each other. Of course, in some embodiments, the laser-incident surface and the laser-exit surface of the combining component 102 may also be nonparallel to each other. For example, a cross section of the combining component 102 is in a shape of a trapezoid, and the cross section is parallel to a plane defined by the first direction Y and the second direction X. Alternatively, the laser-incident surface and the laser-exit surface of the combining component 102 each include uneven surfaces.

In some embodiments, the reflecting portion 1022 is configured to reflect laser beams or fluorescent beams of all colors, and the transmitting portion 1021 is configured to transmit the laser beam emitted by the light-emitting assembly 101 and reflect the fluorescent beam emitted by the phosphor wheel 104.

For example, the combining component 102 includes a dichroic mirror and a reflector, and the combining component 102 is formed by splicing the dichroic mirror and the reflector. The dichroic mirror constitutes the transmitting portion 1021 of the combining component 102, and the reflector constitutes the reflecting portion 1022 of the combining component 102.

Figure 15:
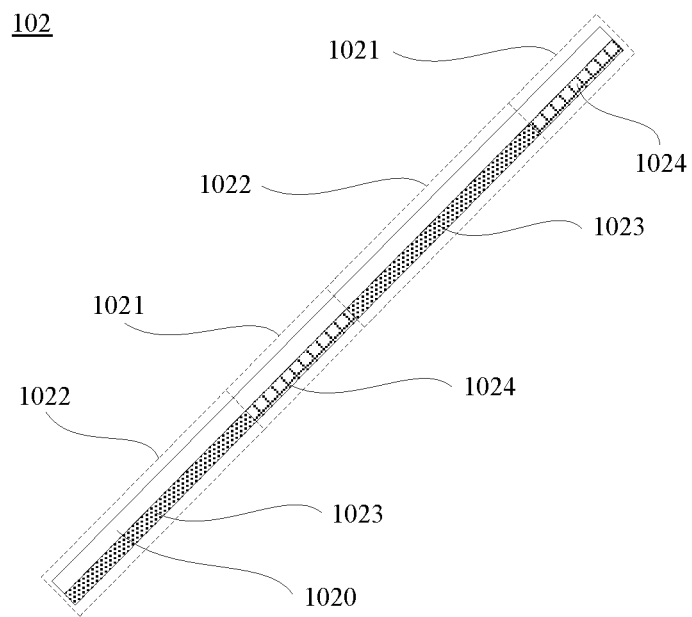
FIG. 15 is a diagram showing a structure of a combining component, in accordance with some embodiments.

For another example, FIG. 15 is a diagram showing a structure of a combining component, in accordance with some embodiments. As shown in FIG. 15, the combining component 102 includes a first substrate 1020, a first coating film 1023 and a second coating film 1024. The first substrate 1020 may be a transparent substrate. The first coating film 1023 is disposed on a surface of the first substrate 1020. For example, the first coating film 1023 is disposed on a surface of the first substrate 1020 proximate to or away from the first lens 103. The first coating film 1023 is configured to reflect the laser beam and the fluorescent beam incident on the first coating film 1023. The first coating film 1023 may be a reflective film for all wavelength ranges. Alternatively, the first coating film 1023 may be a reflective film for at least one of the wavelength range of red light, the wavelength range of green light, or the wavelength range of blue light.

The second coating film 1024 is disposed on the surface of the first substrate 1020. For example, the second coating film 1024 is disposed on the surface of the first substrate 1020 proximate to or away from the first lens 103. The second coating film 1024 is configured to transmit the laser beam emitted by the light-emitting assembly 101 and reflect the fluorescent beam emitted by the phosphor wheel 104. For example, the second coating film 1024 transmits blue light and reflects at least one of red light, yellow light, or green light.

A portion of the first substrate 1020 covered by the first coating film 1023 constitute the reflecting portion 1022 of the combining component 102, and a portion of the first substrate 1020 covered by the second coating film 1024 constitute the transmitting portion 1021 of the combining component 102.

For another example, the combining component 102 includes a dichroic mirror and a first coating film 1023. The first coating film 1023 is disposed on a portion of a surface of the dichroic mirror. A portion of the dichroic mirror not covered by the first coating film 1023 constitutes the transmitting portion 1021 of the combining component 102, and a portion of the dichroic mirror covered by the first coating film 1023 constitute the reflecting portion 1022 of the combining component 102.

It will be noted that, in a case where the first coating film 1023 is disposed on a surface of the first substrate 1020 (or the dichroic mirror) proximate to the phosphor wheel 104, the laser beam reflected by the phosphor wheel 104 may be directly reflected by the first coating film 1023. Thus, the laser beam does not need to pass through the first substrate 1020 again, to avoid light loss caused by the laser beam passing through the first substrate 1020 for many times. Of course, the second coating film 1024 may also be disposed on the surface of the first substrate 1020 proximate to the phosphor wheel 104, to directly reflect the fluorescent beam emitted by the phosphor wheel 104, which reduces the light loss.

In addition, in a case where the combining component 102 includes only the reflecting portion 1022, the combining component 102 may only be composed of a plurality of reflectors that are arranged at intervals, and the laser beam emitted by the light-emitting assembly 101 may pass through gaps between the plurality of reflectors.

In some embodiments, the combining component 102 further includes an anti-reflection film, and the anti-reflection film is disposed on a surface of the transmitting portion 1021. The anti-reflection film may increase transmittance of light of a full spectrum, or the anti-reflection film only increases transmittance of the laser beam (e.g., the blue laser beam) emitted by the light-emitting assembly 101, and the present disclosure is not limited thereto.

In some embodiments, as shown in FIG. 10, the first lens 103 is located between the combining component 102 and the phosphor wheel 104, and the optical axis H of the first lens 103 is parallel to the laser-exit direction (e.g., the first direction Y) of the light-emitting assembly 101. The first lens 103 is configured to converge the laser beam, so as to form a small beam spot on the laser-receiving surface 140 of the phosphor wheel 104. For example, the first lens 103 is located on a side of the combining component 102 away from the light-emitting assembly 101. The first lens 103 is further configured to collimate the laser beam reflected by the phosphor wheel 104 and the fluorescent beam emitted by the phosphor wheel 104, so that the laser beam reflected by the phosphor wheel 104 and the fluorescent beam emitted by the phosphor wheel 104 may be incident on the combining component 102 in a form of approximately parallel beam. The first lens 103 includes a convex lens, and a convex arc surface of the convex lens protrudes toward the combining component 102.

In some embodiments, the first lens 103 may include a plurality of convex lenses, and the plurality of convex lenses may be arranged in sequence along an arrangement direction of the combining component 102 and the phosphor wheel 104, and optical axes of the plurality of convex lenses are collinear. In this way, it is possible to improve a converging effect of the first lens 103, so that the laser beam incident on the first lens 103 may be converged on the phosphor wheel 104 accurately, and the laser beam reflected by the phosphor wheel 104 and the fluorescent beam emitted by the phosphor wheel 104 may be incident on the combining component 102 accurately. For example, as shown in FIG. 10, the first lens 103 includes a first convex lens 1031 and a second convex lens 1032, the first convex lens 1031 is closer to the combining component 102 than the second convex lens 1032. The first laser beam S1 and the second laser beam S2, after passing through the first convex lens 1031 and the second convex lens 1032, are refracted at a certain angle and converged on the phosphor wheel 104.

Figure 16:
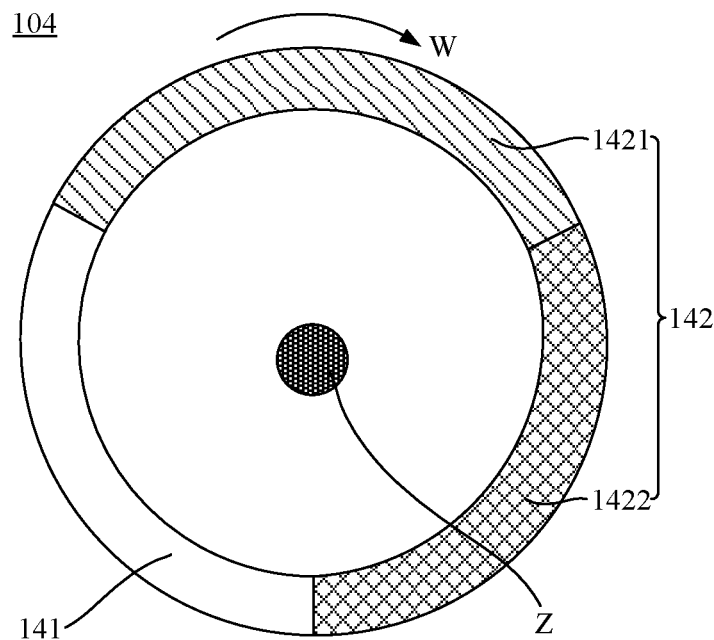
FIG. 16 is a diagram showing a structure of a phosphor wheel, in accordance with some embodiments.

FIG. 16 is a diagram showing a structure of a phosphor wheel, in accordance with some embodiments.

In some embodiments, as shown in FIG. 16, the phosphor wheel 104 includes a first region 141 and a second region 142. The first region 141 and the second region 142 are enclosed to form a closed-loop shape (e.g., a ring). The first region 141 is configured to reflect the laser beam incident on the first region 141. The second region 142 is configured to be excited to emit the fluorescent beam due to irradiation of the laser beam incident on the second region 142. It will be noted that, a color of the fluorescent beam emitted by the phosphor wheel 104 is different from a color of the laser beam emitted by the light-emitting assembly 101.

For example, the phosphor wheel 104 includes a second substrate. The second substrate may be a reflective substrate. The first region 141 may be a portion of the reflective substrate. A surface of the reflective substrate corresponding to the second region 142 is provided with a fluorescent material (e.g., phosphor powder), and a fluorescent material of one color may be excited to emit a fluorescent beam of the one color. For example, when the laser beam is incident on the second region 142, the laser beam may excite the phosphor powder in the second region 142 to emit a fluorescent beam of the corresponding color, and the fluorescent beam is reflected to the first lens 103 by the reflective substrate.

Of course, the second substrate of the phosphor wheel 104 may also be a non-reflective substrate. For example, the second substrate includes a ceramic substrate, and a reflective film layer may be provided on the ceramic substrate. Different regions of a surface of the reflective film layer of the second substrate are coated with the fluorescent material. A region of the reflective film layer that is coated with the fluorescent material forms the second region 142 of the phosphor wheel 104. A region of the reflective film layer that is not coated with the fluorescent material forms the first region 141 of the phosphor wheel 104.

In some embodiments, as shown in FIG. 10, the laser source 10 further includes a rotating shaft Z. The phosphor wheel 104 may rotate around the rotating shaft Z, and the rotating shaft Z is parallel to the first direction Y. For example, as shown in FIG. 16, the phosphor wheel 104 is in a shape of a circular ring. The rotating shaft Z passes through a center of the circular ring and is perpendicular to the laser-receiving surface 140 of the phosphor wheel 104. The phosphor wheel 104 may rotate around the rotating shaft Z in a W direction or an opposite direction of the W direction. During the rotation of the phosphor wheel 104, the laser beam transmitted through the combining component 102 is converged by the first lens 103 and then may irradiate on different regions (e.g., the first region 141 or the second region 142) of the phosphor wheel 104.

When the laser beam is incident on the first region 141, the first region 141 reflects the laser beam, and the laser beam reflected by the first region 141 is incident on the combining component 102 after passing through the first lens 103. When the laser beam is incident on the second region 142, the second region 142 is excited by the laser beam, to emit the fluorescent beam, and the fluorescent beam is incident on the combining component 102 after passing through the first lens 103.

In some embodiments, a side of the phosphor wheel 104 away from the first lens 103 is opaque to light. In a case where the second region 142 of the phosphor wheel 104 emits the fluorescent beam, the fluorescent beam exits in various directions in a form of Lambert body. By making the side of the phosphor wheel 104 away from the first lens 103 opaque, a light-emitting angle of the second region 142 may be made substantially within a range of 0° to 180° inclusive. Thus, the beam spot formed by the fluorescent beam emitted by the second region 142 on the first lens 103 may substantially cover a surface of the first lens 103 proximate to the phosphor wheel 104. The Lambert body may refer to a light-emitting object that may emit isotropic beams to the surroundings.

In some embodiments, the second region 142 may be provided with at least one of green fluorescent material, red fluorescent material, or yellow fluorescent material. For example, the green fluorescent material may emit green fluorescent beam due to excitation of the laser beam, the red fluorescent material may emit red fluorescent beam due to excitation of the laser beam, and the yellow fluorescent material may emit yellow fluorescent beam due to excitation of the laser beam. Of course, the fluorescent beam emitted by the phosphor wheel 104 may have other colors.

In some embodiments, the second region 142 includes a fluorescence sub-region, each fluorescence sub-region is provided with a fluorescent material of one color.

In some embodiments, the second region 142 includes a plurality of fluorescence sub-regions. For example, as shown in FIG. 16, the second region 142 includes a first fluorescence sub-region 1421 and a second fluorescence sub-region 1422. One of the first fluorescence sub-region 1421 and the second fluorescence sub-region 1422 is provided with red fluorescent material, and another one of the first fluorescence sub-region 1421 and the second fluorescence sub-region 1422 is provided with green fluorescent material. Alternatively, one of the two fluorescence sub-regions may be provided with green fluorescent material, and another one of the two fluorescence sub-regions may be provided with yellow fluorescent material. Alternatively, one of the two fluorescence sub-regions may be provided with green fluorescent material, and another one of the two fluorescence sub-regions may be provided with orange fluorescent material.

In some embodiments of the present disclosure, the description is given by taking an example in which areas of the plurality of fluorescence sub-regions of the second region 142 are equal to each other, and an area of the first region 141 is equal to the area of any one of the fluorescence sub-regions. Of course, the areas of each of the plurality of fluorescence sub-regions and the first region 141 may also be different from each other, and the areas of each of the plurality of fluorescence sub-regions and the first region 141 each may be designed according to a proportion of the laser beam or fluorescent beam of the corresponding color in the white beams to be obtained. For example, in a case where the light-emitting assembly 101 emits a blue laser beam, the first fluorescence sub-region 1421 adopts red fluorescent material, the second fluorescence sub-region 1422 adopts green fluorescent material, and a rotational speed of the phosphor wheel 104 is constant, if the white beams can be obtained by mixing the blue laser beam, the red fluorescent beam and the green fluorescent beam in a ratio of 1:2:1, the area of the first region 141 is equal to an area of the second fluorescence sub-region 1422, and the area of the second fluorescence sub-region 1422 is half of an area of the first fluorescence sub-region 1421.

In some embodiments, as shown in FIG. 10, the laser dimming component 105 is disposed obliquely with respect to the laser-exit direction (e.g., the first direction Y in FIG. 10) of the light-emitting assembly 101.

For example, the laser dimming component 105 has a first surface and a second surface that are opposite to each other. The first surface of the laser dimming component 105 faces towards the light-emitting assembly 101, and the second surface of the laser dimming component 105 faces towards the phosphor wheel 104. The first surface and the second surface of the laser dimming component 105 each form an acute angle with the optical axis H of the first lens 103. The laser beam emitted by the light-emitting assembly 101 is incident on the first surface of the laser dimming component 105, and exits from the second surface of the laser dimming component 105. Moreover, an included angle between an incident direction of the laser beam at the first surface of the laser dimming component 105 and the first surface of the laser dimming component 105 is an acute angle, and an included angle between an exiting direction of the laser beam at the second surface of the laser dimming component 105 and the second surface of the laser dimming component 105 is also an acute angle.

It will be noted that, the incident direction of the laser beam may refer to an incident direction of a central beam of the laser beam, the exiting direction of the laser beam may refer to an exiting direction of the central beam of the laser beam, and the incident direction and the exiting direction may be parallel to the optical axis H of the first lens 103 (or the first direction Y). It can be understood that, the central beam refers to a beam corresponding to a beam spot center of the laser beam.

Since the included angle between the second surface of the laser dimming component 105 and the exiting direction of the laser beam emitted by the light-emitting assembly 101 at the second surface of the laser dimming component 105 is an acute angle, after the laser beam emitted by the light-emitting assembly 101 is diffused by the laser dimming component 105, a beam spot formed by the laser beam at the second surface of the laser dimming component 105 may be stretched into a shape of an ellipse. Thus, a beam spot formed by the laser beam passing through the laser dimming component 105 on the phosphor wheel 104 may be in a shape of an ellipse. It will be noted that, the stretching of the beam spot will be described below.

A beam inlet of the light pipe 2100 is usually in a shape of a rectangle. The beam spot formed on the phosphor wheel 104' by the laser beam emitted by the light-emitting assembly 101' in the related art is approximately in a shape of a circle. Therefore, the beam spot formed at the beam inlet of the light pipe 2100 by the laser beam and the fluorescent beam exiting from the phosphor wheel 104' is also approximately in a shape of a circle, and a matching degree between the beam spot and a shape of the beam inlet of the light pipe 2100 is poor. As a result, a part of the beams cannot enter the light pipe 2100, and no beam is incident on most regions of the beam inlet of the light pipe 2100, so that a light utilization rate is low.

In some embodiments of the present disclosure, the laser dimming component 105 may change the beam spot formed by the laser beam emitted by the light-emitting assembly 101 on the phosphor wheel 104 to be in a shape of an ellipse. In this way, after the laser beam is reflected by the first region 141 of the phosphor wheel 104, the beam spot formed at the beam inlet of the light pipe 2100 by the laser beam may be in a shape of an ellipse; and the beam spot formed at the beam inlet of the light pipe 2100 by the fluorescent beam emitted by the second region 142 of the phosphor wheel 104 due to excitation of the laser beam may also be in a shape of an ellipse. As a result, a matching degree between the beam spot formed at the beam inlet of the light pipe 2100 by the laser beam and the fluorescent beam after combination and the beam inlet of the light pipe 2100 is improved, the light utilization rate is improved, and the light loss is reduced.

It will be noted that, the matching degree between the beam spot and the beam inlet of the light pipe 2100 may refer to a ratio of a major axis to a minor axis of the elliptical beam spot to a length-width ratio of the rectangular beam inlet of the light pipe 2100. For example, the ratio of the major axis to the minor axis of the elliptical beam spot is positively correlated to the length-width ratio of the rectangular beam inlet of the light pipe 2100.

In some embodiments, the acute angle between the second surface of the laser dimming component 105 and the optical axis H of the first lens 103 (or the first direction Y) is positively correlated to the length-width ratio of the beam inlet of the light pipe 2100. The larger the acute angle, the larger a degree of stretching of the laser dimming component 105 to the beam spot, and the slenderer the elliptical beam spot formed by the laser beam after passing through the laser dimming component 105. In this way, an oblique angle of the laser dimming component 105 may be set based on the length-width ratio of the beam inlet of the light pipe 2100, so that the matching degree between the beam spot formed at the beam inlet of the light pipe 2100 by the laser beam and the fluorescent beam after combination and the beam inlet of the light pipe 2100 is high.

For example, the acute angle between the second surface of the laser dimming component 105 and the optical axis H of the first lens 103 may be 30° or 45°.

The smaller the length-width ratio of the beam inlet of the light pipe 2100 is, the closer the second surface of the laser dimming component 105 can be to the optical axis H of the first lens 103. If the second surface of the laser dimming component 105 is parallel to the first direction Y, the laser dimming component 105 cannot change the shape of the beam spot of the laser beam, and the beam spot formed by the laser beam exiting from the laser dimming component 105 is still in a shape of a circle. Of course, in some other embodiments, the laser dimming component 105 may also be disposed perpendicular to the optical axis H of the first lens 103. For example, the first surface and the second surface of the laser dimming component 105 each may be perpendicular to the optical axis H of the first lens 103.

In some embodiments, a distance between a center of the laser dimming component 105 and a principal plane of the first lens 103 is greater than or equal to twice a focal length of the first lens 103. In this way, the laser beam diffused and shaped by the laser dimming component 105 may be converged to the phosphor wheel 104 through the first lens 103.

The center of the laser dimming component 105 may refer to a center of the second surface of the laser dimming component 105. The principal plane of the first lens 103 refers to a plane proximate to the first lens 103 and at a distance from a focus of the first lens 103 equal to the focal length of the first lens 103.

In some embodiments, the first surface of the laser dimming component 105 may be parallel to the second surface of the laser dimming component 105. Alternatively, the first surface of the laser dimming component 105 may be non-parallel to the second surface of the laser dimming component 105.

In some embodiments, the second surface of the laser dimming component 105 may face toward the converging lens 109. Alternatively, the second surface of the laser dimming component 105 may also face away from the converging lens 109. As shown in FIG. 11, if the second surface of the laser dimming component 105 faces toward the converging lens 109, the first surface of the laser dimming component 105 faces away from the converging lens 109. If the second surface of the laser dimming component 105 faces away from the converging lens 109, the first surface of the laser dimming component 105 faces toward the converging lens 109.

In some embodiments, as shown in FIGS. 10 and 11, the laser dimming component 105 is in a shape of a plate. The laser dimming component 105 is located between the light-emitting assembly 101 and the combining component 102, and the laser dimming component 105 is disposed on the laser-incident surface of the combining component 102. The first surface of the laser dimming component 105 faces toward the light-emitting assembly 101, and the second surface of the laser dimming component 105 faces toward the converging lens 109 and the combining component 102.

In this way, by providing the laser dimming component 105 on the combining component 102, it is conducive to simplification of a structure of the laser source 10, so that a volume of the laser source 10 may be small, which is conducive to a miniaturization of the laser projection apparatus 1.

FIG. 10 is illustrated by taking an example in which the laser dimming component 105 is disposed on the combining component 102. Of course, in some embodiments, the laser dimming component 105 and the combining component 102 may be arranged at an interval.

Figure 17:
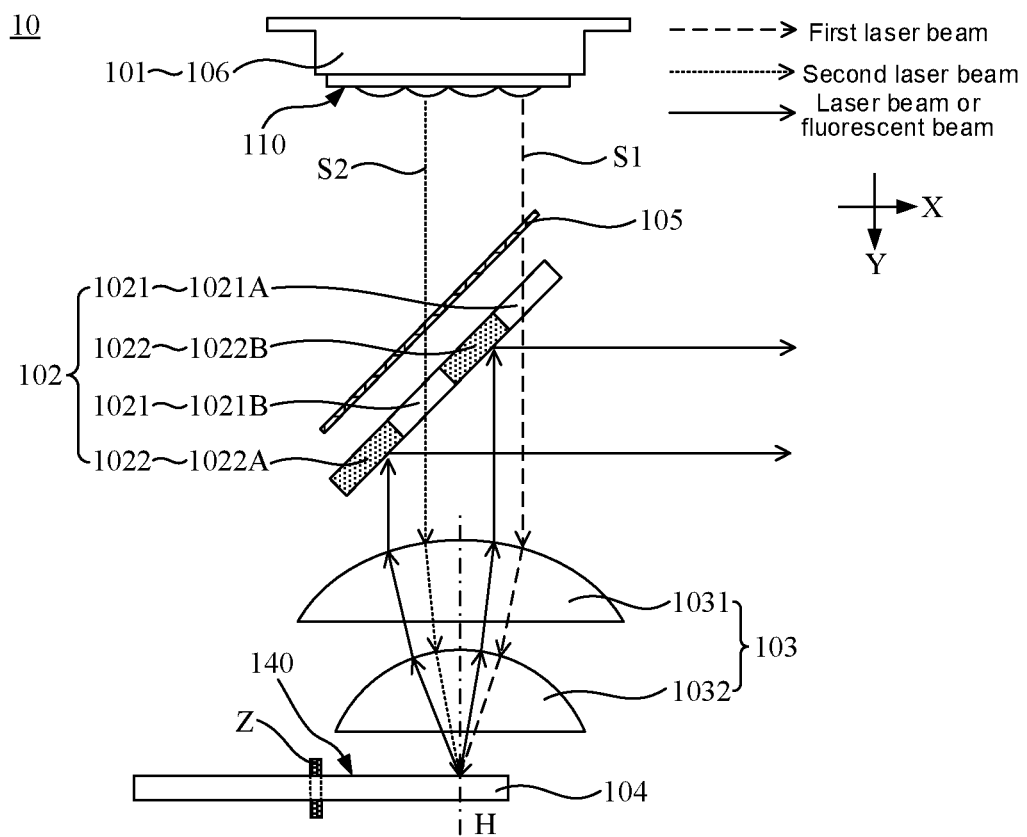
FIG. 17 is a diagram showing a beam path of yet another laser source, in accordance with some embodiments.

FIG. 17 is a diagram showing a beam path of yet another laser source, in accordance with some embodiments. For example, as shown in FIG. 17, the laser dimming component 105 is located between the light-emitting assembly 101 and the combining component 102, and the laser dimming component 105 is provided spaced apart from the combining component 102. The first surface of the laser dimming component 105 faces toward the light-emitting assembly 101, and the second surface of the laser dimming component 105 faces toward the converging lens 109 and the combining component 102.

In this case, the laser dimming component 105 may be disposed between the light-emitting assembly 101 and the combining component 102 through a bracket. Moreover, on a plane perpendicular to the optical axis H of the first lens 103, an orthogonal projection of the second surface of the laser dimming component 105 at least partially overlaps with an orthogonal projection of the laser-incident surface of the combining component 102.

In some embodiments of the present disclosure, by providing the laser dimming component 105 and the combining component 102 separately, the assembly and disassembly of the laser dimming component 105 and the combining component 102 may be facilitated.

Of course, an oblique direction of the laser dimming component 105 in FIG. 17 is not limited thereto.

Figure 18:
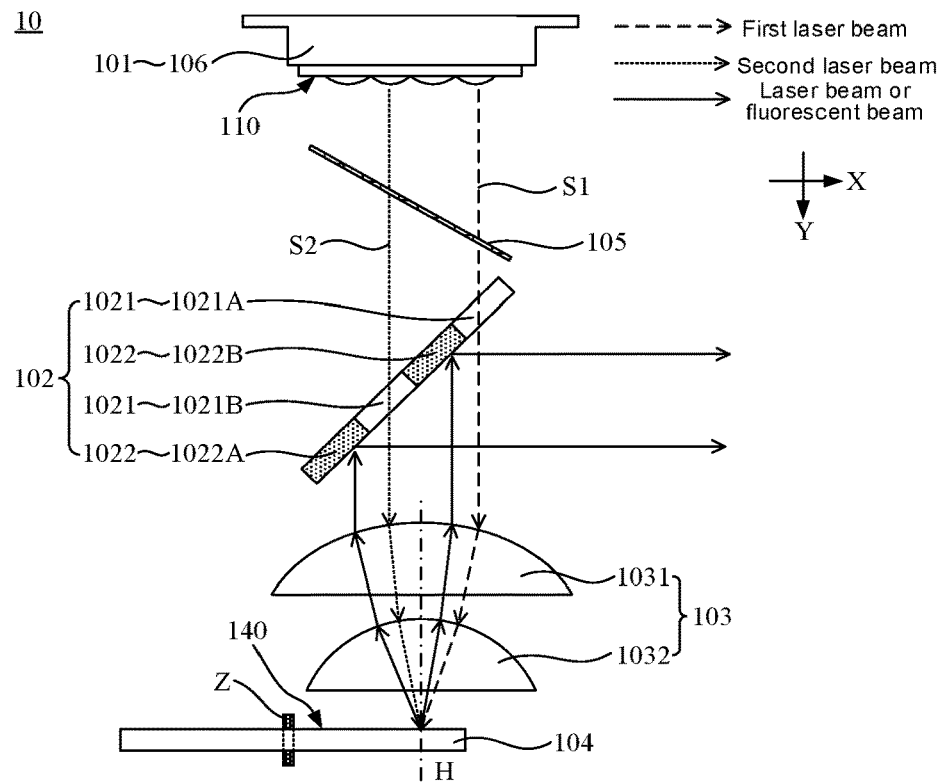
FIG. 18 is a diagram showing a beam path of yet another laser source, in accordance with some embodiments.

FIG. 18 is a diagram showing a beam path of yet another laser source, in accordance with some embodiments. FIG. 18 differs from FIG. 17 mainly in the inclination direction of the laser dimming component 105. For example, as shown in FIG. 18, the first surface of the laser dimming component 105 faces toward the light-emitting assembly 101 and the converging lens 109, and the second surface of the laser dimming component 105 faces away from the converging lens 109 (e.g., facing toward the combining component 102).

The above description is given mainly by taking an example in which the laser dimming component 105 is a one-piece member, and of course, in some embodiments, the laser dimming component 105 may also be separate piece members.

In some embodiments, on the plane perpendicular to the optical axis H of the first lens 103, an orthogonal projection of the laser dimming component 105 coincides with the orthogonal projection of the transmitting portion 1021 of the combining component 102.

Figure 19:
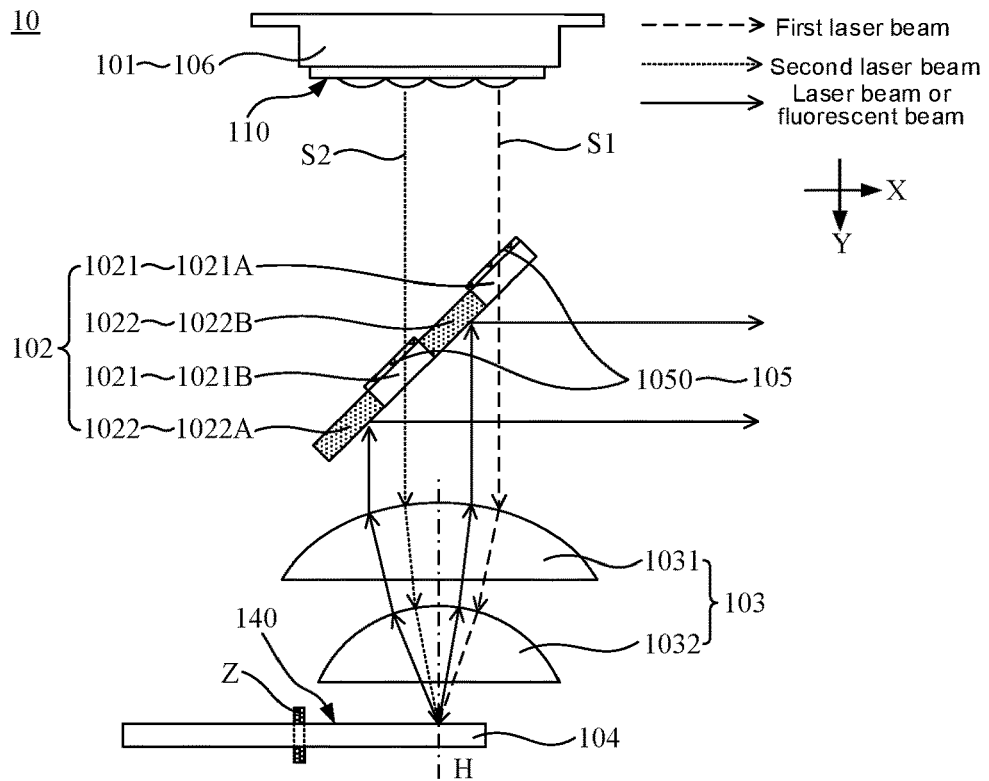
FIG. 19 is a diagram showing a beam path of yet another laser source, in accordance with some embodiments.

FIG. 19 is a diagram showing a beam path of yet another laser source, in accordance with some embodiments. For example, as shown in FIG. 19, the laser dimming component 105 includes a plurality of laser dimming sub-portions 1050, each laser dimming sub-portion is in a shape of a strip, and a number of the plurality of laser dimming sub-portions 1050 is equal to the number of transmitting portions 1021 of the combining component 102.

In this case, the first surface of the laser dimming component 105 includes surfaces of the plurality of laser dimming sub-portions 1050 proximate to the light-emitting assembly 101, and the second surface of the laser dimming component 105 includes surfaces of the plurality of laser dimming sub-portions 1050 away from the light-emitting assembly 101. The first surface of the laser dimming component 105 faces toward the light-emitting assembly 101, and the second surface of the laser dimming component 105 faces toward the converging lens 109 and the combining component 102.

The plurality of laser dimming sub-portions 1050 each are disposed on the laser-incident surface or the laser-exit surface of the combining component 102, and the plurality of laser dimming sub-portions 1050 respectively cover the plurality of transmitting portions 1021 (e.g., the first transmitting portion 1021A and the second transmitting portion 1021B) of the combining component 102.

In some embodiments, the plurality of laser dimming sub-portions 1050 may also be provided spaced apart from the combining component 102. For example, there is a gap between the plurality of laser dimming sub-portions 1050 and the laser-incident surface of the combining component 102, and the plurality of laser dimming sub-portions 1050 are disposed between the light-emitting assembly 101 and the combining component 102 through a bracket. Alternatively, there is a gap between the plurality of laser dimming sub-portions 1050 and the laser-exit surface of the combining component 102, and the plurality of laser dimming sub-portions 1050 are disposed between the combining component 102 and the first lens 103 through a bracket. It will be noted that, FIG. 19 is illustrated by taking an example in which the laser dimming portion 105 includes two laser dimming sub-portions. However, the present disclosure is not limited thereto.

Figure 20:
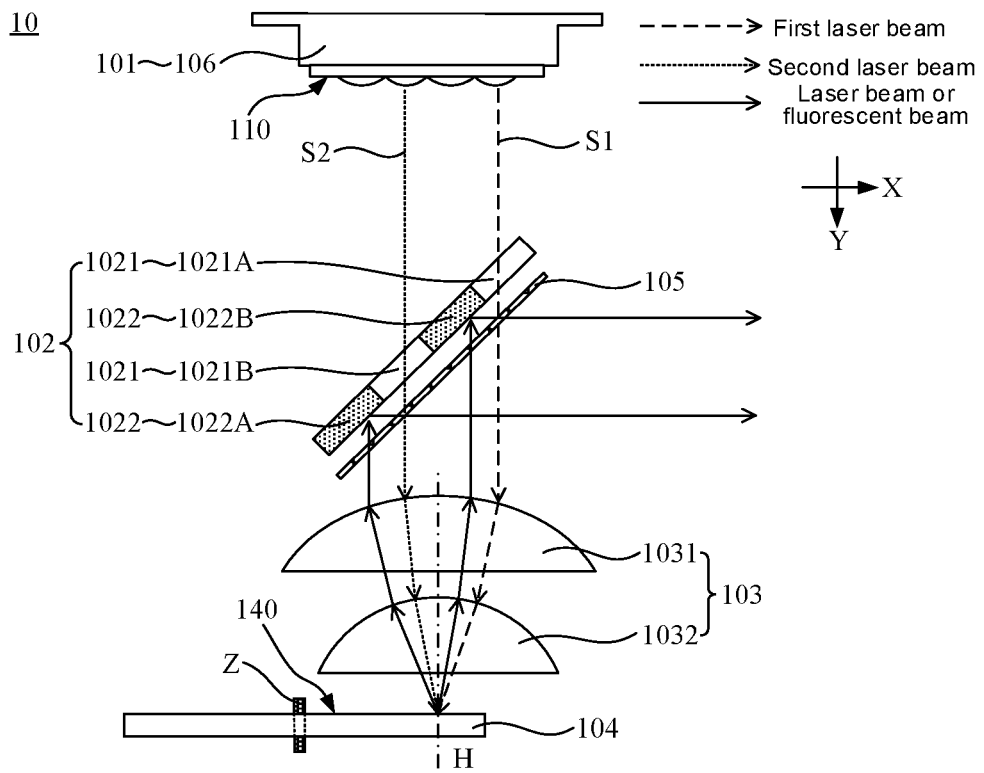
FIG. 20 is a diagram showing a beam path of yet another laser source, in accordance with some embodiments.

FIG. 20 is a diagram showing a beam path of yet another laser source, in accordance with some embodiments.

In some embodiments, the laser dimming component 105 may also be located between the combining component 102 and the first lens 103. For example, as shown in FIG. 20, the first surface of the laser dimming component 105 faces toward the combining component 102, and the second surface of the laser dimming component 105 faces toward the first lens 103. Of course, in a case where the laser dimming component 105 is located between the combining component 102 and the first lens 103, the laser dimming component 105 may also include the plurality of laser dimming sub-portions 1050, and a manner of arranging the plurality of laser dimming sub-portions 1050 is similar to that described above, and details will not be repeated herein.

It will be noted that, FIG. 20 is illustrated by taking an example in which the laser dimming component 105 and the laser-exit surface of the combining component 102 are arranged at an interval. Of course, in some embodiments, the laser dimming component 105 may also include a light diffusion coating, and the light diffusion coating is applied to a region of the laser-exit surface of the combining component 102 corresponding to the transmitting portion 1021.

Figure 21:
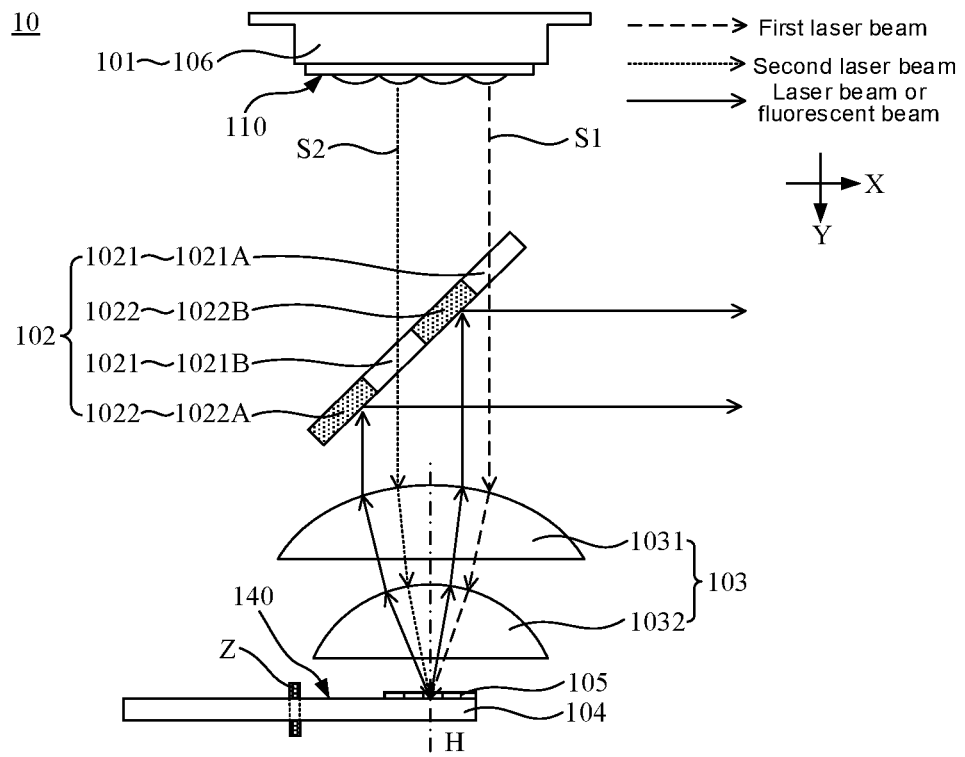
FIG. 21 is a diagram showing a beam path of yet another laser source, in accordance with some embodiments.

FIG. 21 is a diagram showing a beam path of yet another laser source, in accordance with some embodiments.

In some embodiments, the laser dimming component 105 may further be located between the first lens 103 and the phosphor wheel 104. The laser beam emitted by the light-emitting assembly 101 may be incident on the laser dimming component 105 after passing through the first lens 103, and incident on the phosphor wheel 104 after being diffused by the laser dimming component 105. The fluorescent beam emitted by the phosphor wheel 104 due to excitation of the laser beam and the laser beam reflected by the phosphor wheel 104 may pass through the laser dimming component 105 and the first lens 103 and then incident on the combining component 102.

For example, as shown in FIG. 21, the laser dimming component 105 is disposed on the phosphor wheel 104 and is located in the first region 141.

In this way, compared with the related art, the laser dimming component 105 may increase an area of the beam spot formed by the laser beam emitted by the light-emitting assembly 101 on the first region 141 of the phosphor wheel 104. Moreover, a divergence angle of the laser beam reflected by the first region 141 may be expanded again by the laser dimming component 105, and then the laser beam is sequentially incident on the first lens 103 and the combining component 102. As a result, it is possible to further increase the area of the beam spot formed by the laser beam on the combining component 102, reduce a difference between the area of the beam spot of the laser beam reflected by the phosphor wheel 104 and the area of the beam spot of the fluorescent beam emitted by the phosphor wheel 104, and improve a color uniformity of the beam spot formed by the fluorescent beam and the laser beam after combination.

In some embodiments, the laser dimming component 105 may be disposed only on the first region 141 of the phosphor wheel 104, while the laser dimming component 105 does not need to be disposed on the second region 142 of the phosphor wheel 104. In this way, the laser dimming component 105 may only diffuse the laser beam incident on the first region 141 of the phosphor wheel 104 without affecting the fluorescent beam emitted by the second region 142 of the phosphor wheel 104. As a result, it is possible to effectively reduce the difference between the area of the beam spot of the laser beam and the area of the beam spot of the fluorescent beam in the laser source 10, solve the problem of the color boundary phenomenon of the beam spot at the beam inlet of the light pipe 2100, and improve the color uniformity of the beam spot formed by the fluorescent beam and the laser beam after combination.

For example, as shown in FIG. 21, the laser dimming component 105 is disposed on the laser-receiving surface 140 of the phosphor wheel 104 and is located in the first region 141. The second surface of the laser dimming component 105 coincides with a surface (e.g., the laser-receiving surface 140) of the phosphor wheel 104 proximate to the first lens 103. In this way, there is no need to provide a bracket to fix the laser dimming component 105, so that the volume of the laser source 10 may be small, which is conducive to the miniaturization of the laser projection apparatus 1.

Figure 22:
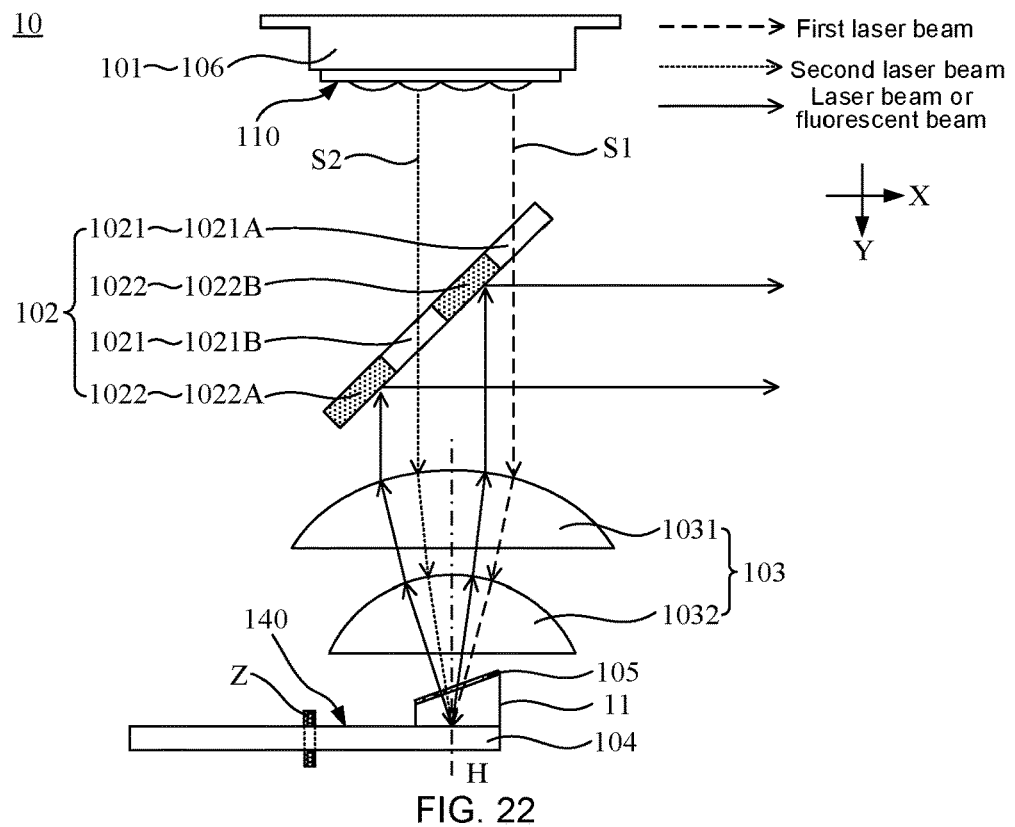
FIG. 22 is a diagram showing a beam path of yet another laser source, in accordance with some embodiments.

FIG. 22 is a diagram showing a beam path of yet another laser source, in accordance with some embodiments.

In some embodiments, the laser dimming component 105 is disposed between the first lens 103 and the phosphor wheel 104, and the laser dimming component 105 and the phosphor wheel 104 are arranged at an interval. For example, as shown in FIG. 22, the laser source 10 further includes a bracket 11, the bracket 11 is disposed on the laser-receiving surface 140 of the phosphor wheel 104, and is located the first region 141, and the laser dimming component 105 is disposed on a side of the phosphor wheel 104 proximate to the first lens 103 through the bracket 11. In this case, on the laser-receiving surface 140 of the phosphor wheel 104, an orthogonal projection of the laser dimming component 105 coincides with an orthogonal projection of the first region 141.

Moreover, the second surface of the laser dimming component 105 may be nonparallel to the laser-receiving surface 140 of the phosphor wheel 104. For example, the laser dimming component 105 is disposed obliquely with respect to the optical axis H of the first lens 103. In this way, the included angle between the second surface of the laser dimming component 105 and the optical axis H of the first lens 103 may be an acute angle, so as to change the beam spot of the laser beam incident on the laser dimming component 105. As a result, the beam spot of the laser beam becomes an elliptical beam spot, so as to be matched with the shape of the beam inlet of the light pipe 2100.

Of course, the laser dimming component 105 may also be disposed in the second region 142 of the phosphor wheel 104, and a manner of arranging the laser dimming component 105 may refer to a manner of providing the laser dimming component 105 on the first region 141, and details will not be repeated herein.

In some embodiments, the laser dimming component 105 may include a diffusion sheet, and the diffusion sheet has a plate shape and is disposed on the first region 141 of the phosphor wheel 104 or on the combining component 102. Alternatively, the laser dimming component 105 may also include an uneven structure formed by particles, a plurality of protrusions that are in a shape of a stripe and parallel to each other, or a light diffusion coating. The uneven structure, the protrusions in a shape of a stripe, or the light diffusion coating may be disposed on the first region 141 of the phosphor wheel 104 or on the combining component 102. It will be noted that, in this case, the fixing of the laser dimming component 105 needs to be attached to other structures (e.g., the combining component 102, the phosphor wheel 104, or the bracket 11).

The above description is given mainly by taking an example in which the laser dimming component 105 is disposed obliquely with respect to the laser-exit direction of the light-emitting assembly 101. Of course, the present disclosure is not limited thereto. In some embodiments, the laser dimming component 105 may also be perpendicular to the laser-exit direction of the light-emitting assembly 101.

Figure 23:
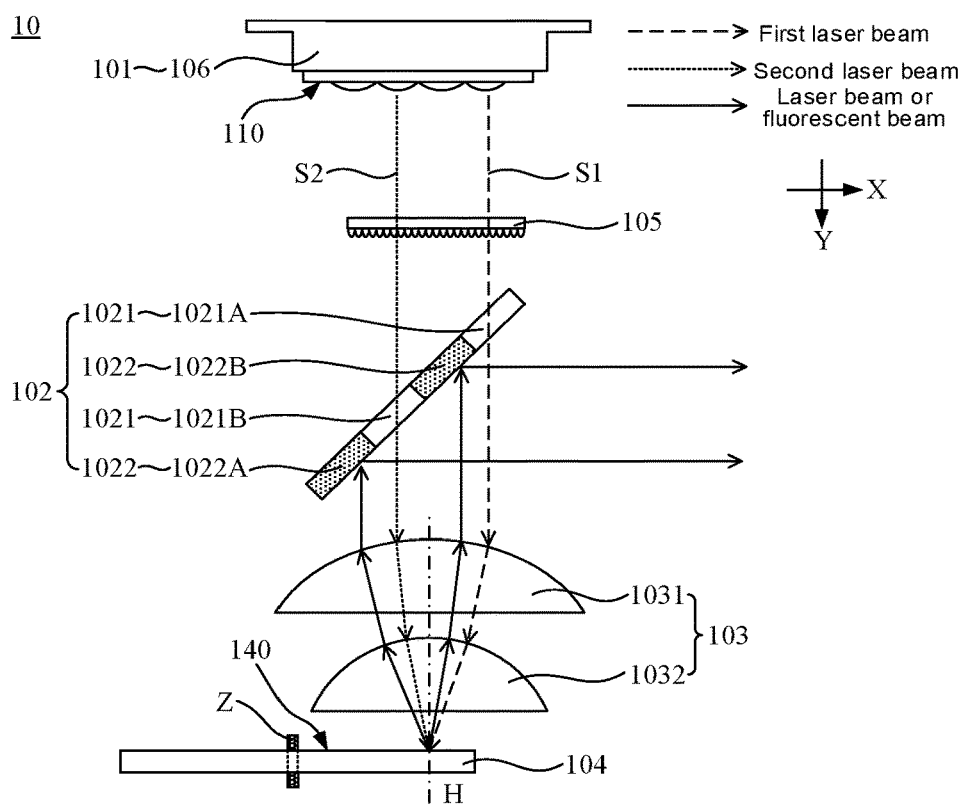
FIG. 23 is a diagram showing a beam path of yet another laser source, in accordance with some embodiments.

FIG. 23 is a diagram showing a beam path of yet another laser source, in accordance with some embodiments. For example, as shown in FIG. 23, the laser dimming component 105 is located between the light-emitting assembly 101 and the combining component 102, and the laser dimming component 105 includes a microlens array (e.g., a single-sided fly-eye lens). The microlens array includes a base and a plurality of microlenses. The plurality of microlenses are arranged on the base, and an orthogonal projection of each microlens on the base is approximately in a shape of a rectangle. A divergence angle of the laser beam diverged by the microlens in a direction in which a long side of the microlens is located may be greater than a divergence angle of the laser beam in a direction in which a short side of the microlens is located. In this way, the beam spot of the laser beam passing through the laser dimming component 105 is substantially in a shape of an ellipse, so that the beam spot formed by the fluorescent beam and the laser beam after combination may be matched with the shape of the beam inlet of the light pipe 2100.

It will be noted that, in some embodiments of the present disclosure, structures, positions, and fixing manners of the laser dimming component 105 may vary. Any of the structures, any of the positions, and any of the fixing manners described above may be combined to obtain a laser dimming component 105. In this way, various laser dimming components 105 may be obtained through different structures, positions, and fixing manners of the laser dimming components 105.

In some embodiments of the present disclosure, a size of the beam spot formed by the fluorescent beam emitted by the phosphor wheel 104 on the combining component 102 is larger than a size of the beam spot formed by the laser beam reflected by the phosphor wheel 104 on the combining component 102. Moreover, the expand amount of the beam spot formed by the fluorescent beam emitted by the phosphor wheel 104 due to excitation of the laser beam corresponding to beam spots with different sizes is substantially constant.

For example, assuming that the beam spot of the laser beam incident on the phosphor wheel 104 is in a shape of a rectangle, a length and width of the beam spot of the fluorescent beam emitted by the phosphor wheel 104 due to excitation of the laser beam each are enlarged by 0.2 mm to 0.4 mm with respect to a length and width of the beam spot of the laser beam. In the related art, the size of the beam spot of the laser beam incident on the phosphor wheel 104 may be 0.3 mm×0.2 mm. That is, the beam spot has a length of 0.3 mm and a width of 0.2 mm. The maximize size of the beam spot of the fluorescent beam emitted by the phosphor wheel 104 due to excitation of the laser beam may be 0.7 mm×0.6 mm. In this case, an area of the beam spot of the fluorescent beam is seven times an area of the beam spot of the laser beam.

However, in some embodiments of the present disclosure, the laser beam emitted by the light-emitting assembly 101, after being diffused by the laser dimming component 105, is incident on the phosphor wheel 104, and is reflected by the phosphor wheel 104 to the combining component 102. The size of the beam spot formed by the laser beam on the combining component 102 is 1.1 mm×0.6 mm, and the maximize size of the beam spot formed on the combining component 102 by the fluorescent beam emitted by the phosphor wheel 104 due to excitation of the laser beam may be 1.5 mm×1 mm, and in this case, the area of the beam spot of the fluorescent beam is 2.3 times of the area of the beam spot of the laser beam. Compared with the related art, the laser dimming component 105 in some embodiments of the present disclosure reduces the difference between the area of the beam spot formed by the fluorescent beam and the area of the beam spot formed by the laser beam, improves the color uniformity of the beam spot formed by the fluorescent beam and the laser beam after combination, improves the color uniformity of the illumination beams emitted by the laser source 10, and improves a display effect of the projection image.

In addition, the laser dimming component 105 may also change the beam spot formed by the laser beam emitted by the light-emitting assembly 101 on the phosphor wheel 104 to be in a shape of an ellipse, so that the beam spot formed by the laser beam and the fluorescent beam at the beam inlet of the light pipe 2100 is also in a shape of an ellipse, which improves the matching degree between the beam spot formed by the fluorescent beam and the laser beam after combination and the beam inlet of the light pipe 2100, and improves the light utilization rate.

Figure 24:
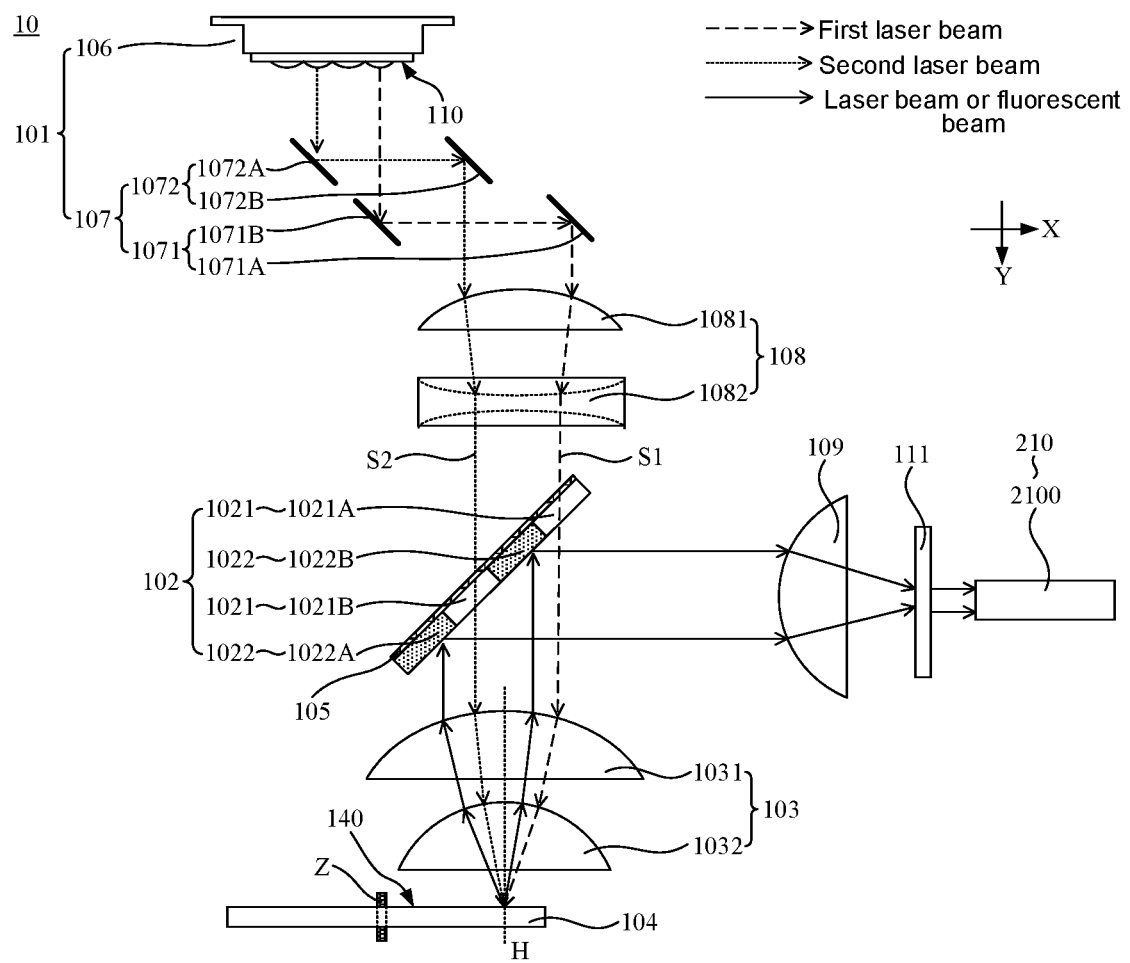
FIG. 24 is a diagram showing a beam path of yet another laser source, in accordance with some embodiments.

FIG. 24 is a diagram showing a beam path of yet another laser source, in accordance with some embodiments.

In some embodiments, as shown in FIG. 24, the laser source 10 further includes a second lens 108. The second lens 108 is located between the light-emitting assembly 101 and the combining component 102, and the second lens 108 is configured to contract a beam spot of the laser beam incident on the second lens 108. That is to say, the second lens 108 may make a beam of the laser beam exiting from the second lens 108 thinner than a beam of the laser beam incident on the second lens 108. Since the second lens 108 may contract the beam spot of the laser beam incident on the combining component 102, a size of the transmitting portion 1021 of the combining component 102 may be small, which is beneficial to reduce a volume of the combining component 102, and facilitate the miniaturization of the laser source 10.

It will be noted that, although the second lens 108 is shown in FIG. 24, the second lens 108 is optional and may be omitted in some embodiments of the present disclosure. That is to say, in some embodiments, the laser source 10 does not include the second lens 108.

In some embodiments, as shown in FIG. 24, the second lens 108 includes a first sub-lens 1081 and a second sub-lens 1082. The first sub-lens 1081 is a convex lens, and the second sub-lens 1082 is a concave lens. The first sub-lens 1081 and the second sub-lens 1082 are arranged in sequence along the first direction Y, and an optical axis of the first sub-lens 1081 and an optical axis of the second sub-lens 1082 may be collinear.

In this way, the second lens 108 may first converge the laser beam emitted by the light-emitting assembly 101 and then diverge the converged laser beam, and after the laser beam emitted by the light-emitting assembly 101 is incident on the second lens 108 in the form of approximately parallel beam, the laser beam may still exit from the second lens 108 to the combining component 102 in the form of approximately parallel beam. For example, the second lens 108 is a telescope system with a high magnification, which may contract the laser beam to a great extent.

In some embodiments, as shown in FIG. 24, the laser source 10 further includes a filter wheel 111, the filter wheel 111 is disposed on a laser-exit side of the converging lens 109, and the filter wheel 111 is configured to filter the laser beam and the fluorescent beam that are incident on the filter wheel 111, so as to improve saturation of colors of the illumination beams exiting from the laser source 10, thereby improving the display effect of the projection image.

A person skilled in the art will understand that, the scope of disclosure in the present disclosure is not limited to specific embodiments discussed above, and may modify and substitute some elements of the embodiments without departing from the spirits of this application. The scope of the application is limited by the appended claims.

What is claimed is:

1. A laser projection apparatus, comprising:
   a laser source configured to emit illumination beams;
   an optical engine configured to modulate the illumination beams, so as to obtain projection beams, and the optical engine including: a light homogenizing component configured to homogenize the illumination beams emitted by the laser source; and a projection lens configured to project the projection beams into an image;

the laser source including:

a light-emitting assembly configured to emit at least one laser beam;

a combining component located on a laser-exit side of the light-emitting assembly and disposed obliquely with respect to a laser-exit direction of the light-emitting assembly, and the combining component including:

at least one reflecting portion configured to reflect a laser beam and a fluorescent beam incident on the at least one reflecting portion; and at least one transmitting portion configured to transmit the at least one laser beam emitted by the light-emitting assembly;

a first lens located on a side of the combining component away from the light-emitting assembly, and the first lens being configured to converge the laser beam transmitted by the at least one transmitting portion;

a phosphor wheel located on a side of the first lens away from the combining component, and the phosphor wheel including:

a first region configured to reflect the laser beam converged by the first lens; and a second region configured to be excited to emit the fluorescent beam due to irradiation of the laser beam converged by the first lens; and a laser dimming component located between the light-emitting assembly and the phosphor wheel, the laser dimming component being configured to increase Etendue of the laser beam emitted by the light-emitting assembly and change a shape of a beam spot provided by the laser beam on the phosphor wheel, so as to make a beam spot provided by the laser beam and the fluorescent beam at a beam inlet of the light homogenizing component matched with a shape of the beam inlet of the light homogenizing component; wherein as the phosphor wheel is rotating, the first region reflects the laser beam incident on the first region, and the second region emits the fluorescent beam due to excitation of the laser beam incident on the second region, the laser beam and the fluorescent beam exiting from the phosphor wheel are incident on the combining component through the first lens, and the combining component reflects the laser beam and the fluorescent beam from the phosphor wheel to a beam outlet of the laser source, so as to be the illumination beams of the laser source.

2. The laser projection apparatus according to claim 1, wherein the laser dimming component is disposed obliquely with respect to the laser-exit direction of the light-emitting assembly, the laser dimming component has a first surface and a second surface, the first surface and the second surface are disposed opposite to each other, and the laser beam emitted by the light-emitting assembly is incident on the first surface and exits from the second surface, wherein an included angle between an incident direction of the laser beam at the first surface and the first surface is an acute angle, and an included angle between an exiting direction of the laser beam at the second surface and the second surface is an acute angle.

3. The laser projection apparatus according to claim 2, wherein the laser dimming component is disposed on the combining component, or the laser dimming component and the combining component are arranged at an interval.

4. The laser projection apparatus according to claim 3, wherein the laser dimming component is located between the light-emitting assembly and the combining component, and the at least one laser beam emitted by the light-emitting assembly is incident on the at least one transmitting portion of the combining component through the laser dimming component;

or the laser dimming component is located between the combining component and the first lens, and the laser beam transmitted by the combining component is incident on the first lens through the laser dimming component.

5. The laser projection apparatus according to claim 4, wherein on a plane perpendicular to an optical axis of the first lens, an orthogonal projection of the laser dimming component coincides with an orthogonal projection of the at least one transmitting portion of the combining component.

6. The laser projection apparatus according to claim 5, wherein the laser dimming component includes:

a plurality of laser dimming sub-portions, on the plane perpendicular to the optical axis of the first lens, an orthogonal projection of each of the plurality of laser dimming sub-portions coinciding with the orthogonal projection of the at least one transmitting portion of the combining component.

7. The laser projection apparatus according to claim 2, wherein the laser dimming component is located between the first lens and the phosphor wheel, and the laser beam converged by the first lens is incident on the phosphor wheel after passing through the laser dimming component; wherein the laser dimming component is disposed on the first region of the phosphor wheel; or, the laser dimming component and the phosphor wheel are arranged at an interval, and on a laser-receiving surface of the phosphor wheel, an orthogonal projection of the laser dimming component overlaps with an orthogonal projection of the first region.

8. The laser projection apparatus according to claim 1, wherein the laser dimming component is disposed perpendicular to the laser-exit direction of the light-emitting assembly, and is located between the light-emitting assembly and the combining component, wherein the laser dimming component includes a microlens array.

9. The laser projection apparatus according to claim 1, wherein the beam inlet of the light homogenizing component is in a shape of a rectangle, and the laser dimming component is configured to change a beam spot provided by the laser beam emitted by the light-emitting assembly on the phosphor wheel into a shape of an ellipse, wherein a ratio of a major axis to a minor axis of an elliptical beam spot is positively correlated to a length-width ratio of the beam inlet of the light homogenizing component.

10. The laser projection apparatus according to claim 9, wherein a distance between a center of the laser dimming component and a principal plane of the first lens is greater than or equal to twice a focal length of the first lens; wherein the laser dimming component has a second surface, the center of the laser dimming component refers to a center of the second surface of the laser dimming component;

the principal plane of the first lens refers to a plane proximate to the first lens and at a distance from a focus of the first lens equal to the focal length of the first lens.

11. The laser projection apparatus according to claim 9, wherein the laser dimming component has a second surface, an included angle between the second surface of the laser dimming component and an optical axis of the first lens is positively correlated to the length-width ratio of the beam inlet of the light homogenizing component.

12. The laser projection apparatus according to claim 1, wherein the combining component has a laser-incident surface and a laser-exit surface, the laser-incident surface and the laser-exit surface are disposed oppositely to each other, the laser-incident surface of the combining component faces toward the light-emitting assembly, the laser-exit surface of the combining component faces toward the first lens, and an included angle between at least one of the laser-incident surface or the laser-exit surface of the combining component and an optical axis of the first lens is an acute angle.

13. The laser projection apparatus according to claim 1, wherein one of the at least one transmitting portion corresponds to one of the at least one reflecting portion, and on a plane perpendicular to the laser-exit direction of the light-emitting assembly, at least a portion of an orthogonal projection of the transmitting portion and at least a portion of an orthogonal projection of a corresponding reflecting portion are symmetrical with respect to an optical axis of the first lens.

14. The laser projection apparatus according to claim 1, wherein an area of the at least one transmitting portion is less than or equal to one-fourth of an area of the at least one reflecting portion.

15. The laser projection apparatus according to claim 1, wherein
the at least one laser beam includes a plurality of laser beams, the at least one transmitting portion includes a plurality of transmitting portions, the at least one reflecting portion includes a plurality of reflecting portions, the plurality of reflecting portions and the plurality of transmitting portions are alternately arranged, and the plurality of laser beams respectively correspond to the plurality of transmitting portions.

16. The laser projection apparatus according to claim 15, wherein the light-emitting assembly includes:
a laser device configured to emit a laser beam; and
at least one mirror group located on a laser-exit side of the laser device, the mirror group being configured to reflect the laser beam emitted by the laser device to the plurality of transmitting portions.

17. The laser projection apparatus according to claim 16, wherein the at least one mirror group satisfies one of followings:
the at least one mirror group includes:
a plurality of mirrors corresponding to the plurality of transmitting portions, the plurality of mirrors being configured to divide the laser beam emitted by the laser device into two or more laser beams, and respectively reflect the two or more laser beams to the plurality of transmitting portions, distances between each of the plurality of mirrors and a laser-exit surface of the laser device being different from each other, and in any two of the plurality of mirrors, at least a portion of an orthogonal projection of one mirror on the laser-exit surface of the laser device does not overlapping with at least a portion of an orthogonal projection of another mirror on the laser-exit surface of the laser device;

or
the at least one mirror group includes:
a mirror configured to change a propagation direction of the laser beam emitted by the laser device, so as to make the laser beam emitted by the laser device be incident on the plurality of transmitting portions.

18. The laser projection apparatus according to claim 1, wherein the at least one transmitting portion is further configured to reflect the fluorescent beam emitted by the phosphor wheel, and the combining component satisfies one of followings:
the transmitting portion includes a dichroic mirror, and the reflecting portion includes a reflector;

or
the combining component includes:
a first substrate;
a first coating film disposed on a surface of the first substrate, so as to be the reflecting portion, and the first coating film being configured to reflect the laser beam and the fluorescent beam that are incident on the first coating film; and
a second coating film disposed on the surface of the first substrate, so as to constitute the transmitting portion, and the second coating film being configured to transmit the laser beam emitted by the light emitting assembly and reflect the fluorescent beam emitted by the phosphor wheel;

or
the combining component includes:
a dichroic mirror; and
a first coating film disposed on a portion of a surface of the dichroic mirror, so as to constitute the reflecting portion, the first coating film being configured to reflect the laser beam and the fluorescent beam that are incident on the first coating film, and a portion of the dichroic mirror not covered by the first coating film constituting the transmitting portion.

19. The laser projection apparatus according to claim 1, wherein the phosphor wheel includes:
a second substrate, the first region and the second region being located on a surface of the second substrate proximate to the light-emitting assembly, and the first region and the second region being enclosed to a closed-loop shape.

20. The laser projection apparatus according to claim 19, wherein the phosphor wheel satisfies one of followings:
the second substrate includes a reflective substrate, a region of the reflective substrate provided with a fluorescence material layer being the second region, and a region of the reflective substrate other than the second region being the first region;

or
the second substrate includes a non-reflective substrate and a reflective film layer disposed on the non-reflective substrate, a region of the reflective film layer provided with a fluorescence material layer being the second region, and a region of the reflective film layer other than the second region being the first region.

\* \* \* \* \*

UNITED STATES PATENT AND TRADEMARK OFFICE
CERTIFICATE OF CORRECTION

| | | |
|---|---|---|
| PATENT NO. | : 12,117,719 B2 | Page 1 of 1 |
| APPLICATION NO. | : 18/071438 | |
| DATED | : October 15, 2024 | |
| INVENTOR(S) | : Wei Li et al. | |

It is certified that error appears in the above-identified patent and that said Letters Patent is hereby corrected as shown below:

On the Title Page

At item (30) Foreign Application Priority Data:
Delete "202010577387.X" and replace it with --202010577387-- therefor
Delete "202110243232.2" and replace it with --202110243232-- therefor Signed and Sealed this
Fourth Day of February, 2025

Coke Morgan Stewart
*Acting Director of the United States Patent and Trademark Office*